March 12, 1940.    H. O. FLETCHER    2,193,193
MILLING MACHINE
Filed July 14, 1937    11 Sheets-Sheet 1

INVENTOR
Henry O. Fletcher

March 12, 1940.　　H. O. FLETCHER　　2,193,193
MILLING MACHINE
Filed July 14, 1937　　11 Sheets-Sheet 3

INVENTOR
Henry O. Fletcher

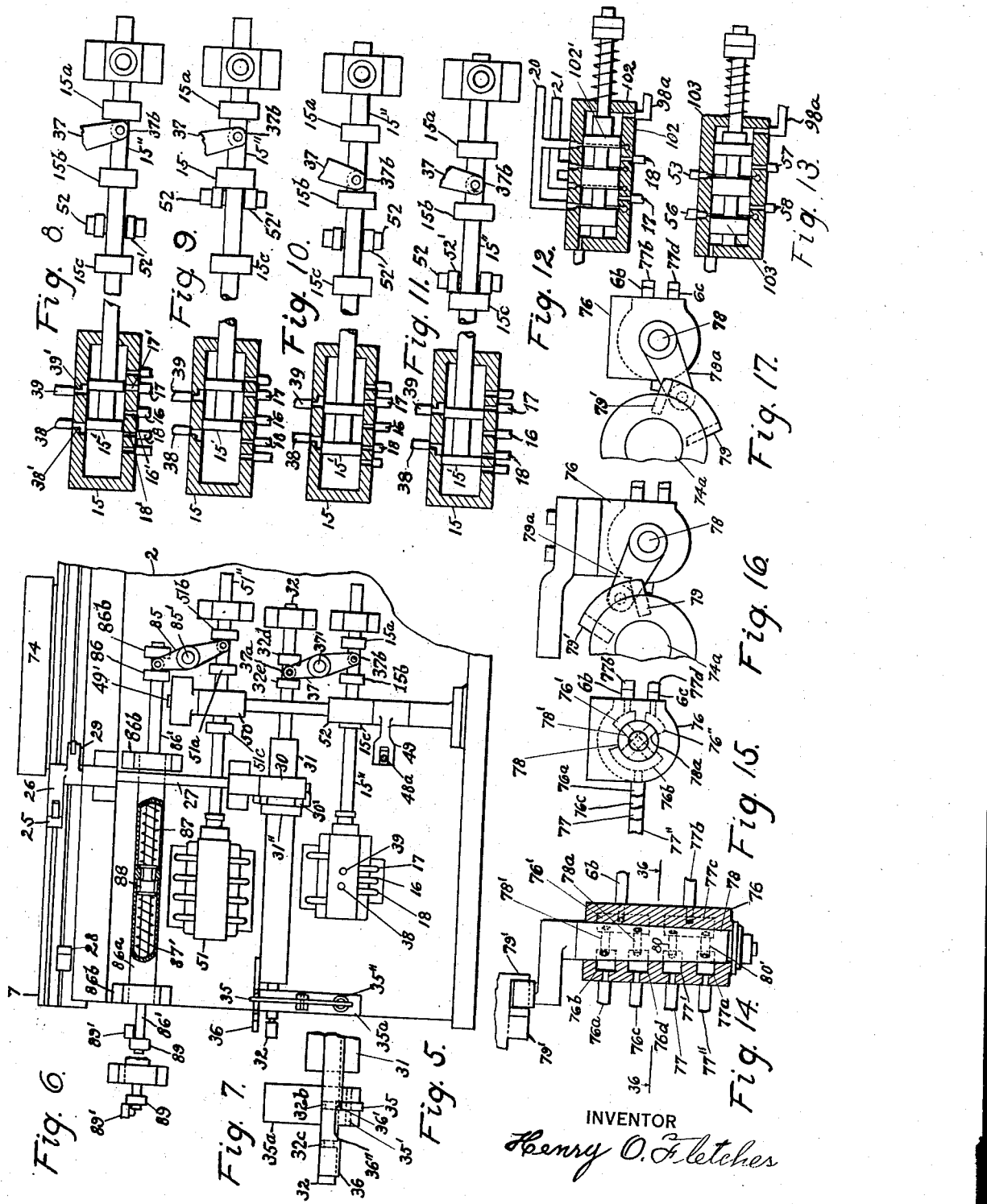

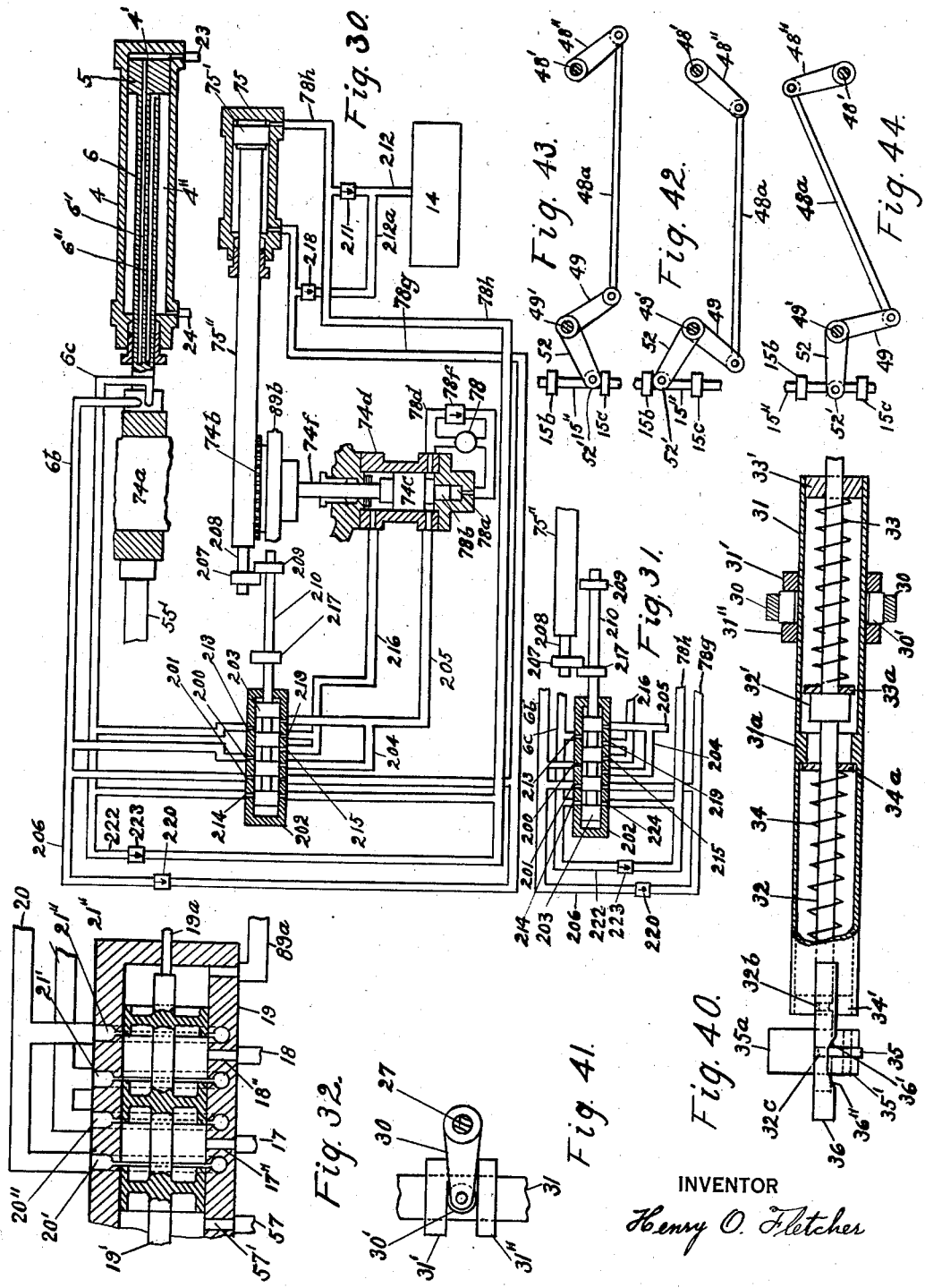

March 12, 1940.   H. O. FLETCHER   2,193,193
MILLING MACHINE
Filed July 14, 1937   11 Sheets-Sheet 7
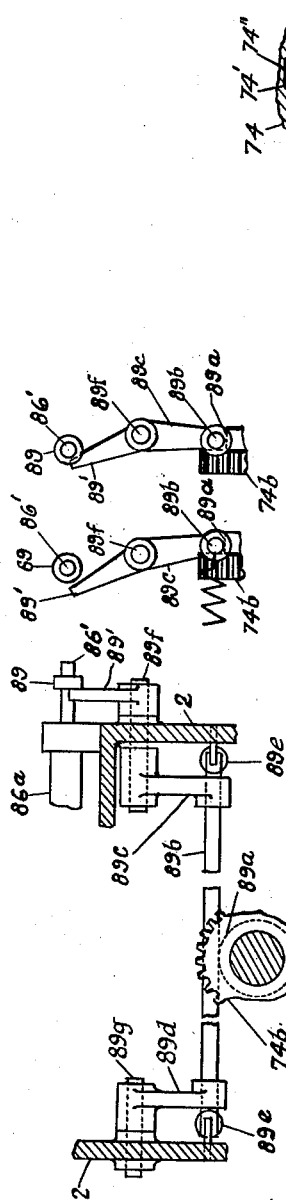
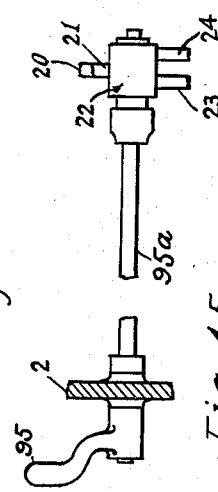
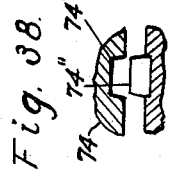
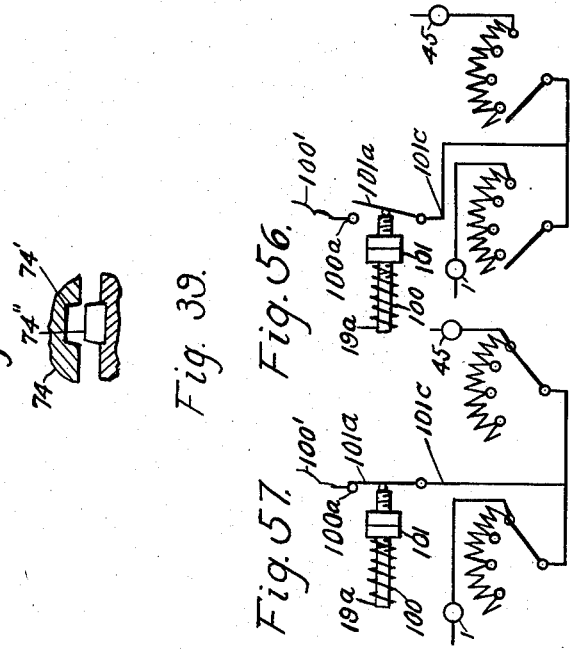
INVENTOR
Henry O. Fletcher March 12, 1940.  H. O. FLETCHER  2,193,193
MILLING MACHINE
Filed July 14, 1937  11 Sheets-Sheet 8

INVENTOR
Henry O. Fletcher

March 12, 1940. H. O. FLETCHER 2,193,193
MILLING MACHINE
Filed July 14, 1937 11 Sheets-Sheet 9

INVENTOR
Henry O. Fletcher

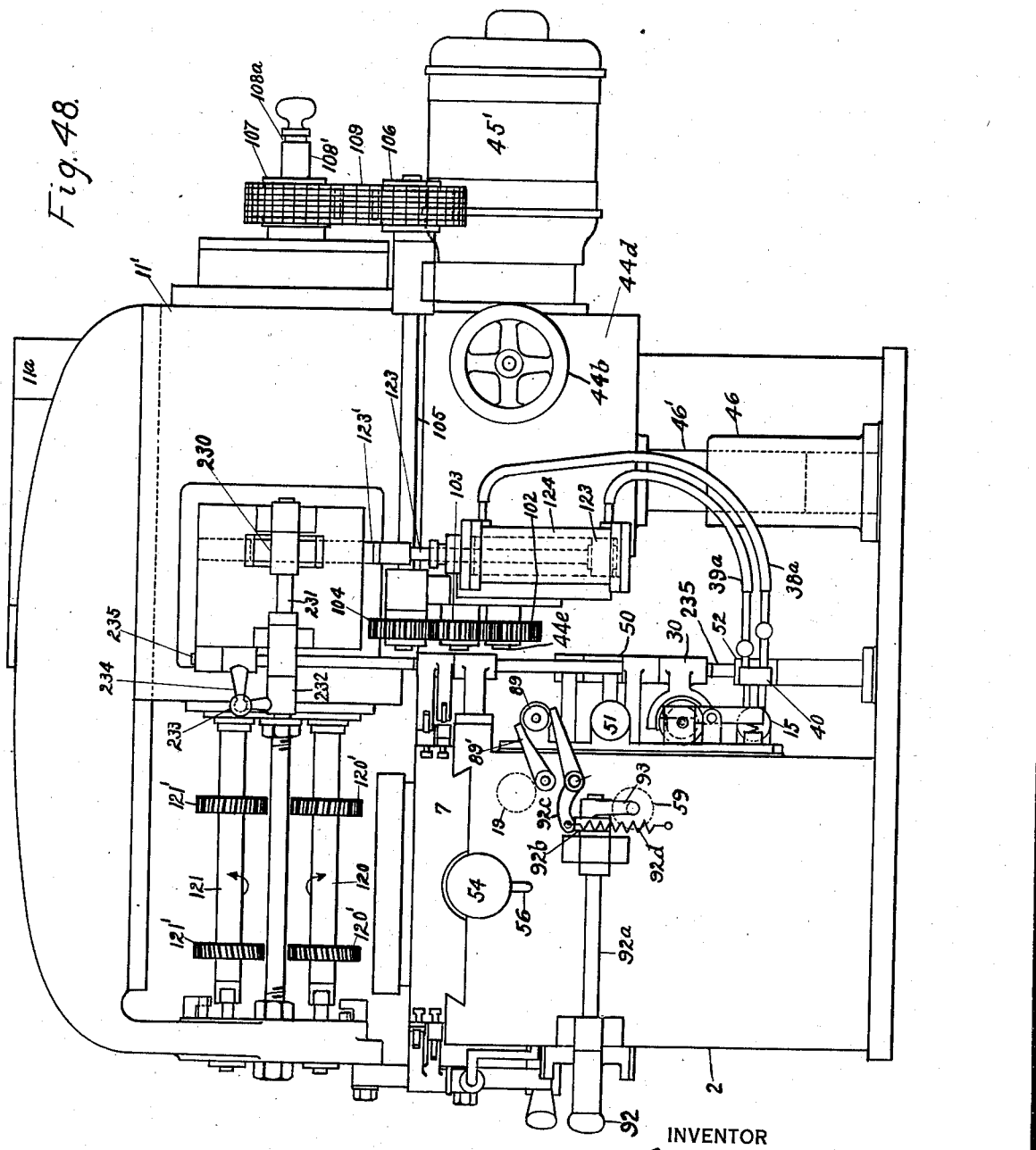

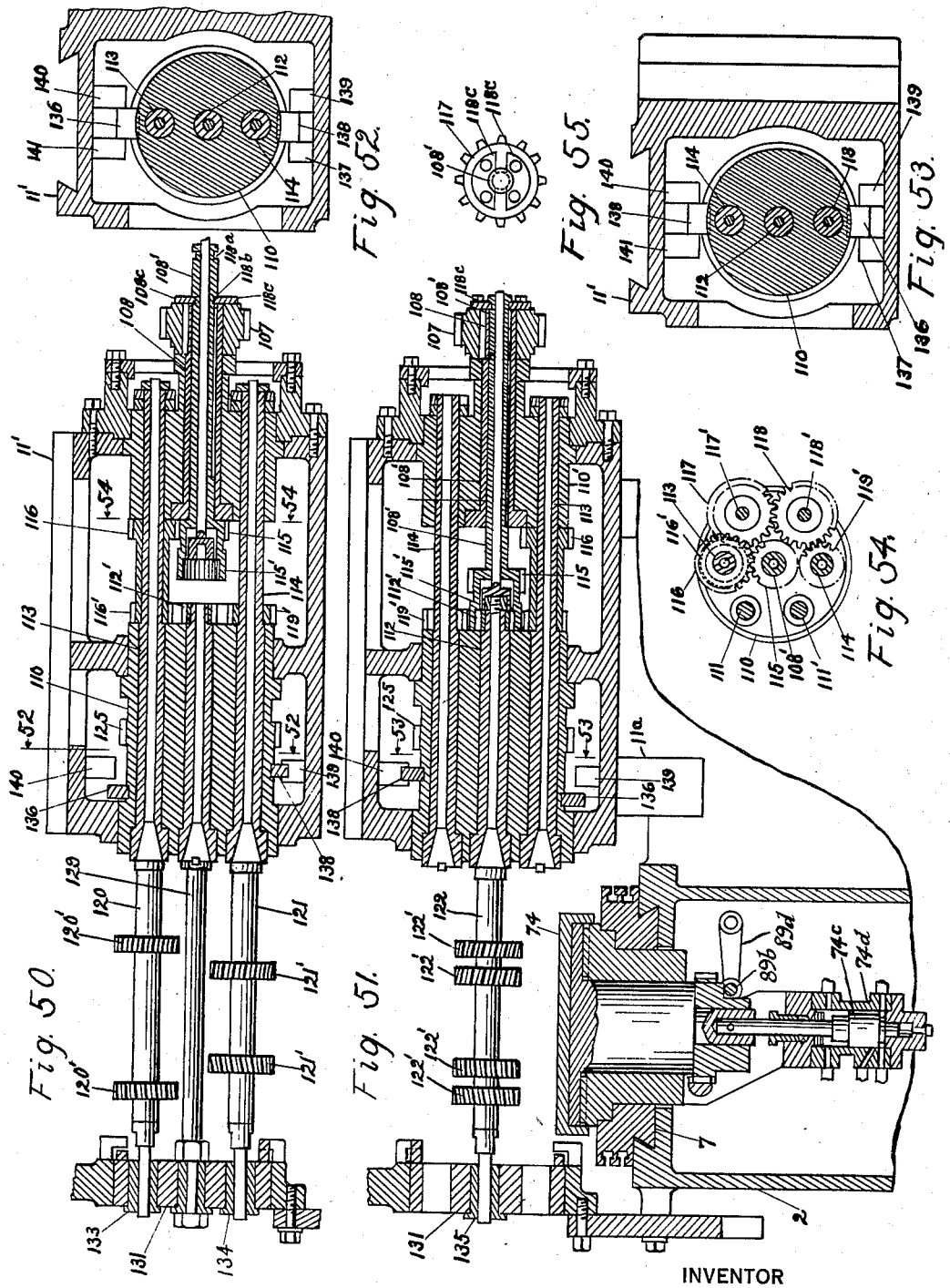

Patented Mar. 12, 1940

2,193,193

UNITED STATES PATENT OFFICE 2,193,193

MILLING MACHINE

Henry O. Fletcher, Manchester, N. H.

Application July 14, 1937, Serial No. 153,505

22 Claims. (Cl. 90—21.5)

My invention relates to milling machines, and particularly to automatic machines especially adapted to operate on work where a great number of similar parts are required, but may be used for the usual variety of operations, most of the movements being effected by hydraulic power.

One object of my invention is to produce a machine that operates on the work in both directions of the reciprocation without the necessity of the usual idle return movement. Another object is to save time by accelerating the portions of the movements in which no cutting operation takes place, or when the cutter is approaching and clearing the work. Another object is to provide automatic stabilization of the feeding movement when using the machine for climb, or hook, milling, or for preventing any damage to the machine, in case climb milling is not desired, and the operator makes a mistake in setting up so that the cutter has a tendency to draw into the work.

Another object is to prevent vibration during the cutting operation.

Another object is to provide complete automatic and manual control of the machine at all times.

Another object is to provide a hydraulic system that is automatically controlled without a complication of intricate mechanical and power devices for this purpose.

Another object is to raise the turret and hold it in raised position during indexing of the same by hydraulic pressure, thus greatly reducing friction and the power required for this purpose.

Other objects will be manifested in the following description.

Fig. 5 is a fragmental elevation looking from the right of Fig. 3 showing the mechanism for controlling the main and automatic stop valves.

Fig. 6 is a fragmental view showing another position of the stop control for the automatic stop valve. Fig. 7 is a fragmental plan view showing the manner of tripping the load and fire mechanism for operating the main valve. Figs. 8 to 11 are sectional views of the main valve and operating mechanism showing the valve plunger in its several positions of operation. Figs. 12 and 13 are sectional views of the regulating servo-valve when used independently of the regulating stop valve.

Fig. 14 is a sectional elevation of the double reverse valve and Fig. 15 is a plan view of the same. Figs. 16 and 17 are plan views showing the device for operating the double reverse valve in different positions of operation.

Figs. 18 and 19 are sectional views of the automatic regulating valve showing it in different positions of operation.

Figure 2:
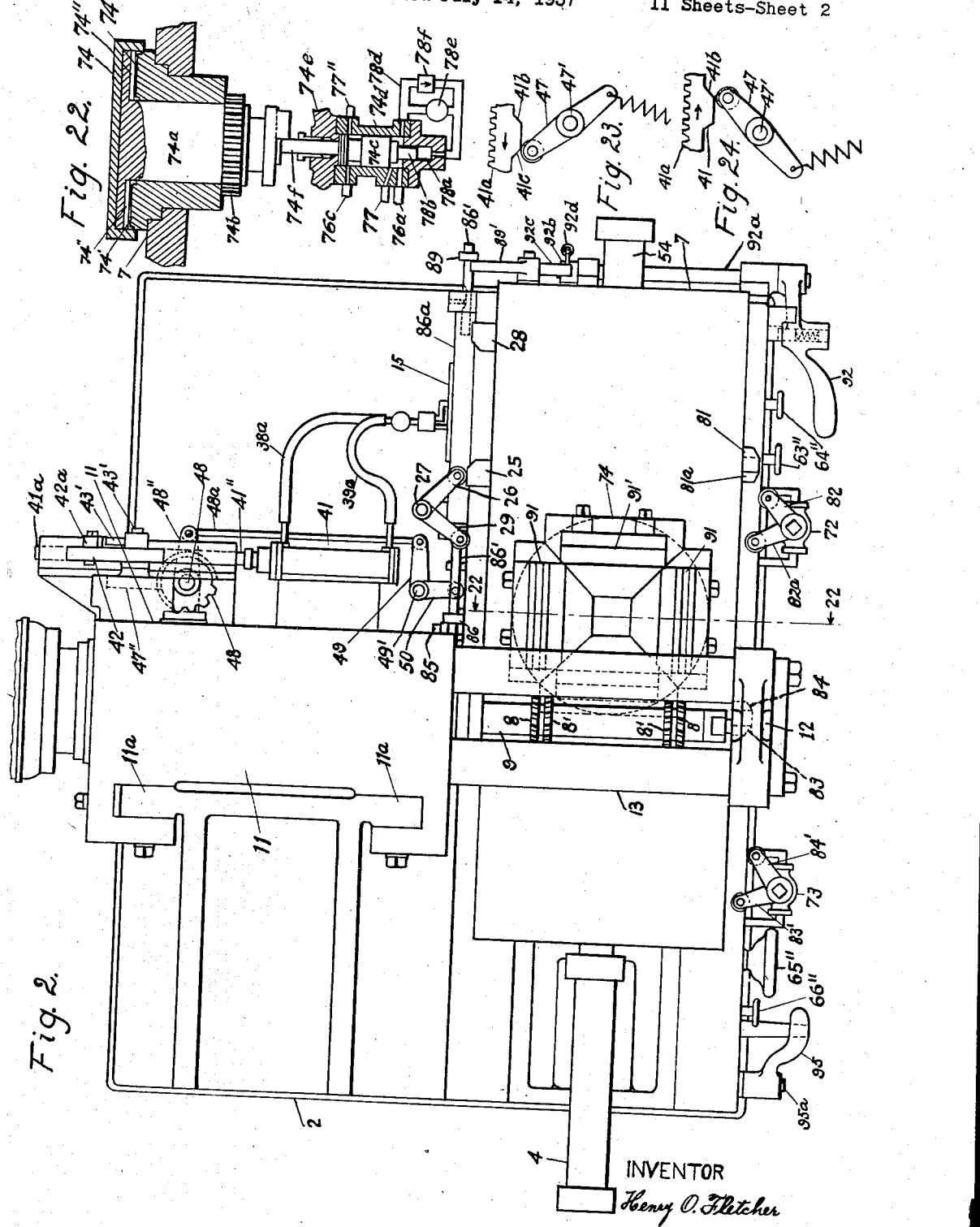
Fig. 2 is a plan view and Fig. 3 is an end, or side, elevation looking from the right of Fig. 1.

Figs. 20 and 21 are sectional views showing the method of mounting, operating and adjusting the feed control valves. Fig. 22 is a section taken on line 22—22 of Fig. 2, showing the turret in raised position. Figs. 23 and 24 are fragmental views in elevation showing the method of operating the valve reversing lever. Figs. 25 to 27 are sectional views of the automatic stop valve showing the plunger in its several positions of operation. Figs. 28 and 29 are sectional views of the manually operated stop valve showing the plunger in normal and stop positions.

Fig. 30 is a diagram showing a preferred method of reversing the pressure in the cylinder for raising and lowering the turret, and Fig. 31 is a sectional view of the reversing valve used therewith showing the plunger in reverse position.

Fig. 32 is a fragmental section of the automatic control valve showing the form of the ports.

Fig. 33 is a plan view of the mechanism for operating the automatic stop valve, and Figs. 34 and 35 are elevations of same in different positions of operation.

Fig. 36 is a section taken on line 36—36 of Fig. 14, showing the lower half of the double reverse valve, and Fig. 37 is a sectional elevation of the same.

Figs. 38 and 39 are fragmental views of the keys for holding the turret in position showing them in engaged and disengaged positions, respectively.

Fig. 40 is a sectional view showing the load and fire mechanism for operating the main valve, and Fig. 41 is a plan view of the lever for operating the same.

Figs. 42 and 43 are plan views showing the lever and connecting rod for operating the valve mechanism in different positions of operation.

Fig. 44 is a plan view showing the position of the valve operating lever when climb or hook milling is used.

Fig. 45 is an elevation of the connections for operating the valve for reversing the movement of the table valve.

Figure 46:
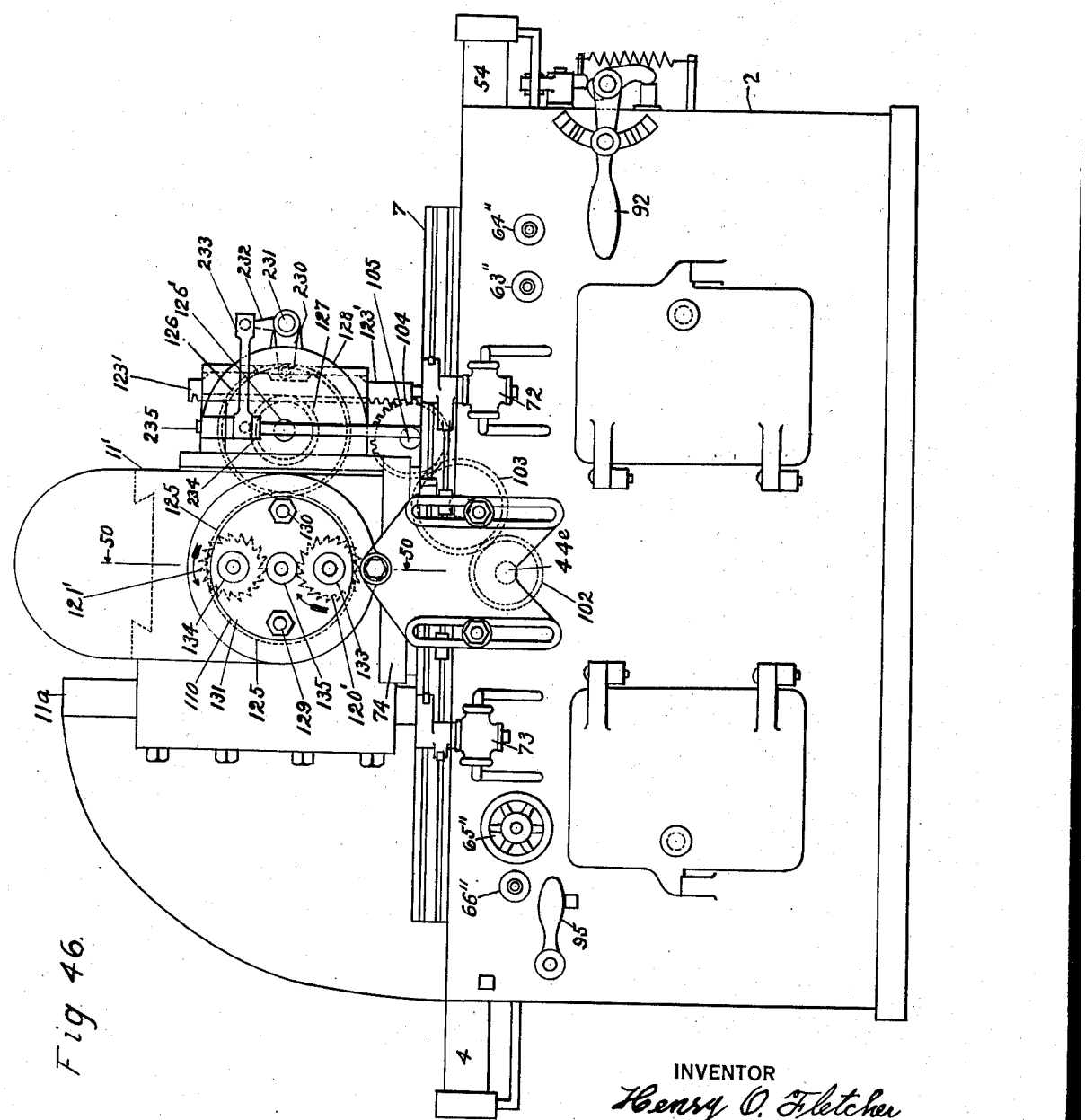
Figures 47, 49:
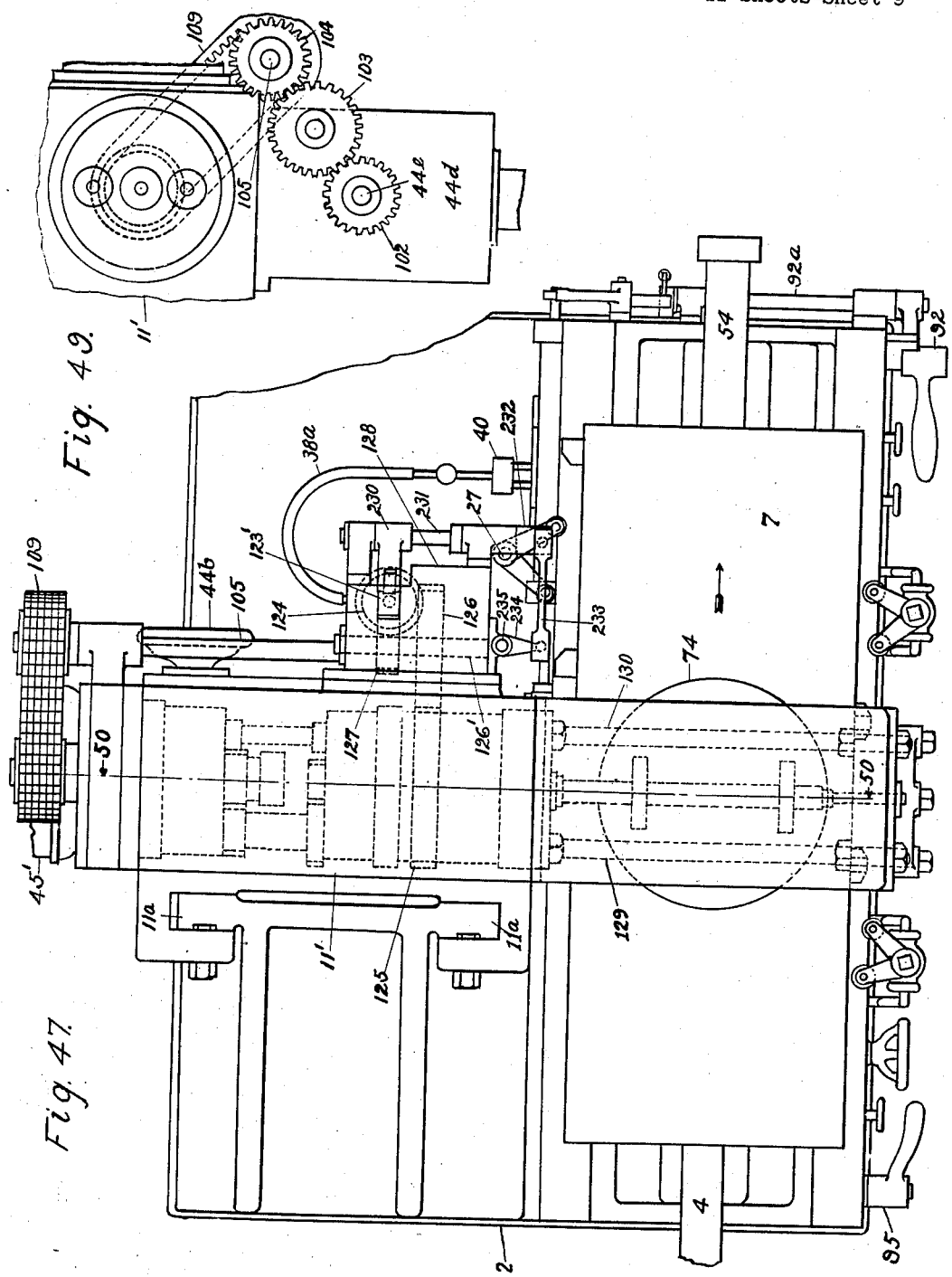

Fig. 46 is a front elevation of another embodiment of my invention. Fig. 47 is a plan view, and Fig. 48 is a side elevation of the same looking from the right of Fig. 46. Fig. 49 is a front elevation showing the connecting gearing for driving the cutter.

Fig. 50 is a section, taken on line 50—50 of Fig. 47, showing the cutter spindle drive when two spindles are used, and Fig. 51 is similar to Fig. 50 showing the spindle drive when a single spindle is used. Fig. 52 is a section taken on line 52—52 of Fig. 50 showing the stops for stabilizing the cutter carrier. Fig. 53 is a sectional view taken on line 53—53 of Fig. 51 showing the stops for stabilizing the cutter carrier in another position of operation. Fig. 54 is a section taken on line 54—54 of Fig. 50 showing the gearing for driving the cutter spindles. Fig. 55 is an end elevation of the cutter spindle drive showing the method of locking the spindle in place.

Figs. 56 and 57 are diagrams of the electrical safety device showing the position of the parts during the running and stopping of the machine, respectively.

Referring to Figs. 1 to 29 of the drawings, the motor 1, mounted within base 2, operates the constant pressure pump 3 which takes fluid from tank 14 and supplies it under pressure to hydraulic motor cylinder 4 for operating piston 5 slidably mounted within the cylinder 4, and connected, by piston rod 6, to carriage 7 on which the work to be operated upon is mounted.

The cutters 8 and 8' are mounted on arbor 9 which is driven by spindle 10 rotatably mounted in head 11, the outer end of arbor 9 being supported in bearing 12 mounted in the overarm support 13.

The work 91 and 91' is preferably held by fixtures supported by a turret mounted on carriage, or table 7.

Referring more especially to Figs. 4, 18, 19, 28 and 29, the pump 3 is connected to the main valve 15 by conduit 16. Port 17' of valve 15 is connected to port 17'' of compensating valve 19 by conduit 17.

Port 18', in valve 15, is connected to port 18'' in compensating valve 19, by conduit 18.

Ports 20' and 20'', in valve 19, are connected to reverse valve 22 by conduit 20, and ports 21' and 21'' are connected to reverse valve 22 through conduit 21.

Reverse valve 22 is connected to the right hand end of cylinder 4 by conduit 23, and the left hand end of cylinder 4 is connected to reverse valve 22 through conduit 24.

Figure 4:
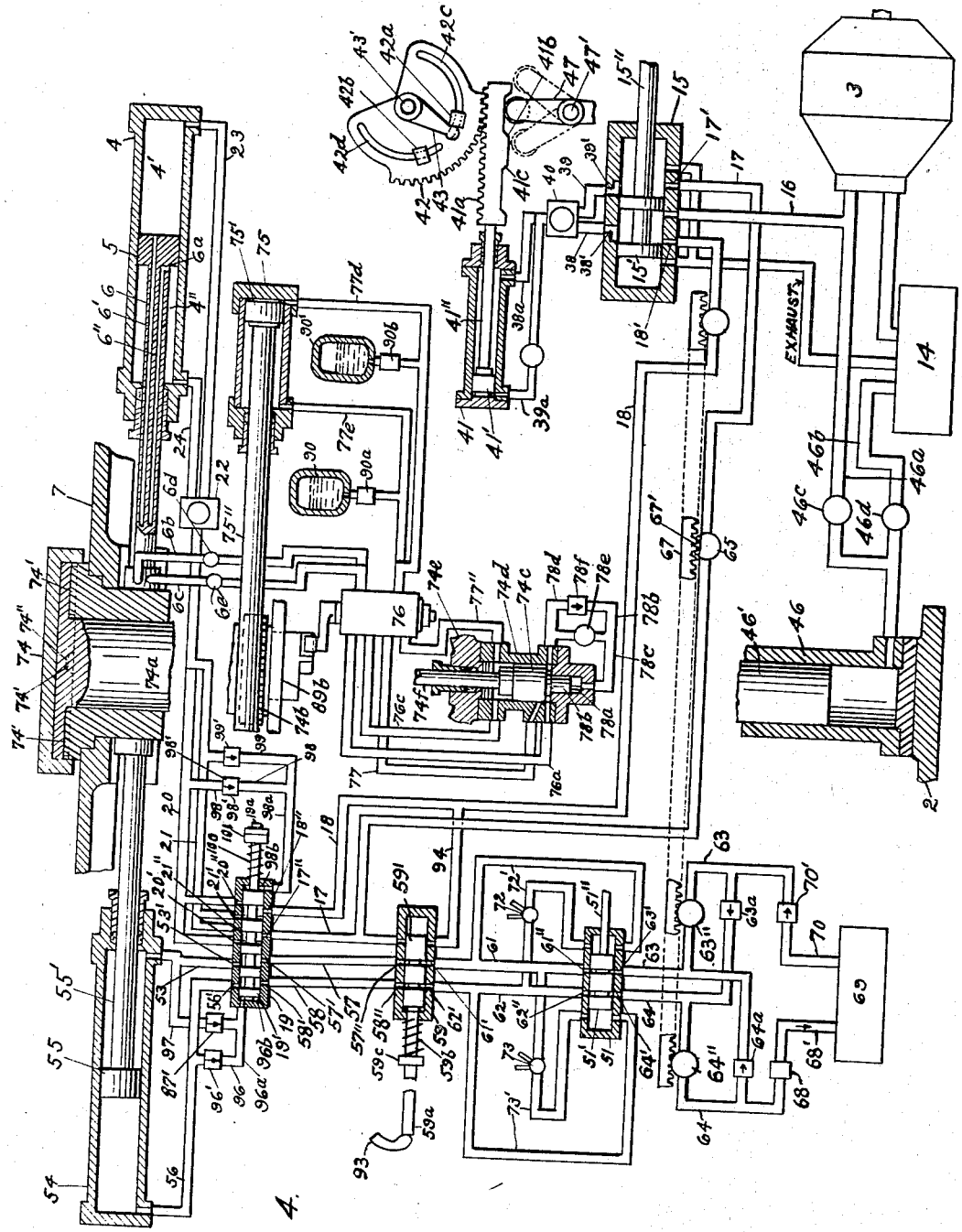
Fig. 4 is a diagram of a preferred hydraulic system for operating and controlling the movements of the machine.

When plunger 15', of valve 15, is in its extreme left-hand position, as shown in Figs. 4 and 11, supply conduit 16 is connected to port 18'' by conduit 18, and when in its extreme right-hand position, as shown in Fig. 9, conduit 16 is connected to port 17'' through conduit 17.

When plunger 19', of compensating valve 19, is in its left-hand position, as shown in Figs. 4 and 18, port 17'' is connected to port 20' and port 18'' is connected with port 21', and when plunger 19' is in its right-hand position port 17'' is connected to port 21'' and port 18'' is connected to port 20''. By the above it will be seen that the movement of plunger 19' from left to right will reverse the flow of fluid in conduits 20 and 21 and therefore reverse the pressure from one end of cylinder 4 to the other consequently reverse the tendency of action of piston 5. Also when the hand operated reverse valve 22 is turned to reverse position the pressure on piston 5 will be reversed, the purposes of which will be explained later.

It will be seen by the foregoing that piston 5 will be propelled in one direction or the other by the action of plunger 15' or of plunger 19' of valve 19.

Reverse valve 22 is introduced into the circuit for use in emergency cases, as will be explained later, and is manually operated, and has nothing to do with the normal working of the machine.

Figure 1:
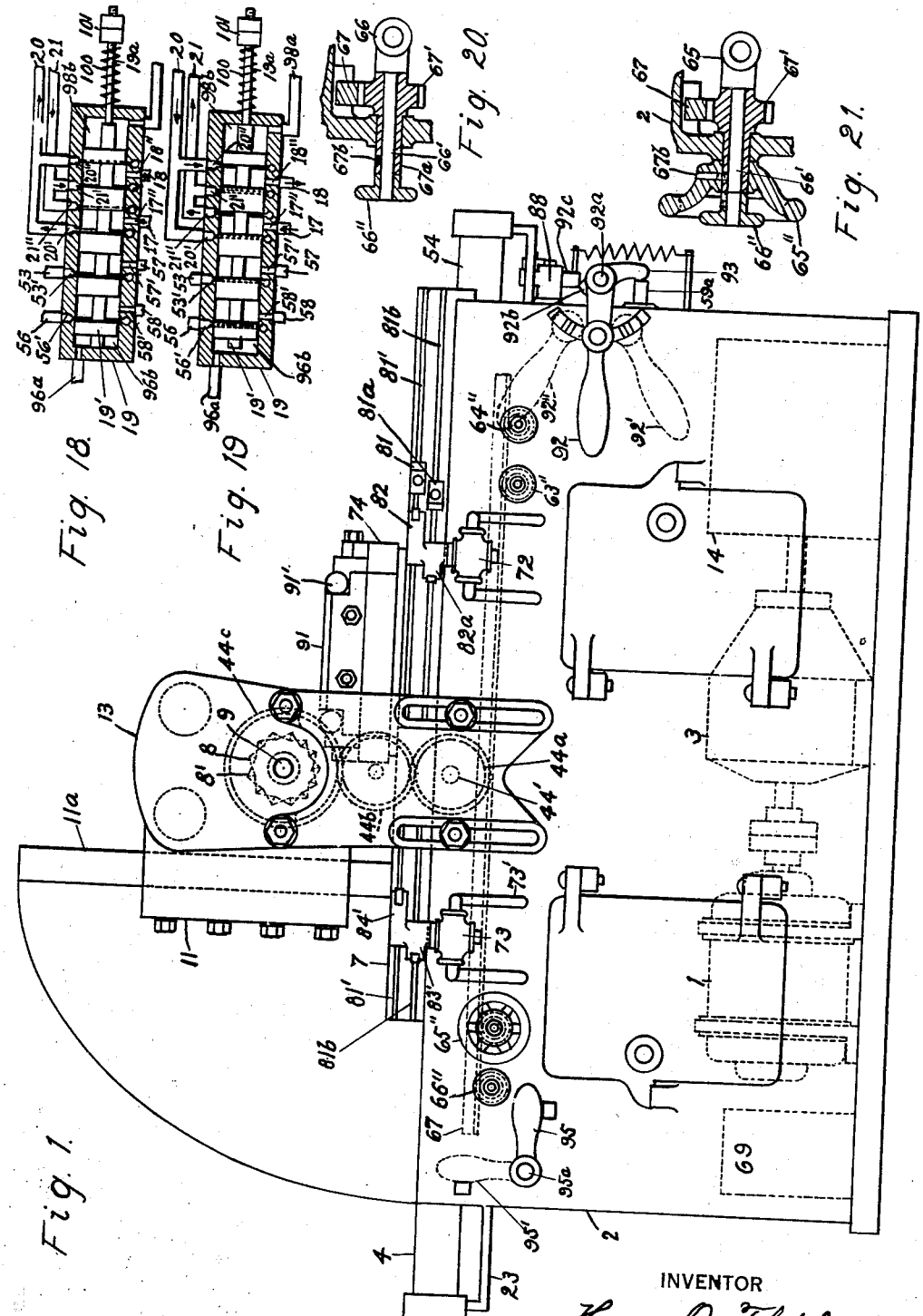
Fig. 1 is a front elevation of one embodiment of my invention.

The normal position of plunger 19' is to the left as shown in Figs. 4 and 18, and the reverse valve 22, when in its normal position connects conduit 21 with conduit 23 and conduit 20 with conduit 24, so that when valve plunger 15' is in its extreme left-hand position, as shown in Figs. 4 and 11, fluid under pressure will flow from conduit 16 through conduits 18, 21 and 23 to the right-hand end of cylinder 4 to propel piston 5 and table 7 to the left, as shown in Fig. 4, but to the right as shown in Figs. 1 and 2.

When plunger 15' is in its extreme right-hand position, as shown in Fig. 9, fluid under pressure will flow from conduit 16 through conduit 17, 20 and 24 to the left-hand end of cylinder 4 to translate piston 5 and table 7 to the right as shown on Fig. 4.

The dog 25 is adjustably mounted on the side of table 7 by means of a tee slot, and is adapted to engage lever arm 26, mounted fast on upright shaft 27, when table 7 is traveling to the right, as shown in Fig. 2, to turn shaft 27 anticlockwise, and dog 28, adjustably mounted on table 7, is adapted to engage lever arm 29, also fast on shaft 27, to turn it clockwise when table 7 travels in the opposite direction.

Shaft 27 is freely mounted in bearings as shown and the forked lever 30 is fastened to the lower end of shaft 27 and straddles tube 31, in which the load and fire mechanism, for operating valve plunger 15', is assembled. Collars 31' and 31'' are fast on tube 31, and rolls 30' are freely mounted on the ends of forked lever 30 and engage collars 31' and 31''. When dog 25 engages lever 26, to turn shaft 27 and forked lever 30 anticlockwise as viewed in Figs. 2 and 41, rolls 30' engage collar 31'' to force tube 31 to the left as viewed in Figs. 5 and 40, and when dog 28 engages lever 29 to turn shaft 27 and lever 30 clockwise rolls 30' engages collar 31' to force tube 31 to the right as viewed in Fig. 5.

Shaft 32 is mounted within tube 31 and has mounted fast thereon collar 32' in a manner to pass freely within and register with ledge 31a formed within tube 31. Springs 33 and 34 are mounted over shaft 32 and within tube 31 and are held under compression by inside collars 33' and 34', respectively, fastened in the ends of tube 31. The washer 33a is freely mounted over shaft 32 and between collar 32' and spring 33 in a manner to cause spring 33 to be compressed when tube 31 is forced to the left and shaft 32 is held against movement, and washer 34a is mounted in like manner between spring 34 and collar 32' to cause spring 34 to be compressed when tube 31 is forced to the right and shaft 32 is held against movement.

Shaft or rod 32, has formed thereon, the annular grooves 32b and 32c, as shown; these grooves being engaged by latch 35 which is fulcrumed at 35' in bearing 35a, and normally held in engagement with groove 32b, or 32c, as the case may be, by spring 35''.

The finger 36, fastened to tube 31 and extending out over shaft 32 has formed thereon cams 36' and 36'' for engaging latch 35 to swing it out of engagement with grooves 32c and 32b, respectively, allowing the compression of spring 33 or 34 to force collar 32' into position to register with ledge 31a.

By the foregoing it will be seen that when dog 25 forces tube 31 to the left, as shown in Fig. 5, that latch 35 will hold shaft 32, from movement, compressing spring 33, until cam 36' disengages latch 35 from groove 32c when shaft 32 will be forced to the left, and when dog 28 forces tube 31 to the right, shaft 32 will be held from movement until cam 36" disengages latch 35 from groove 32b when shaft 32 will be forced to the right.

The lever 37 is fulcrumed at 37' on a bearing attached to base 2 and is forked at both ends, the upper end being provided with rolls 37a that engage collars 32d and 32e fast on shaft 32. On the lower forked ends of lever 37 are freely mounted rolls 37b which engage collars 15a and 15b fast on plunger rod 15" which is formed integral with plunger 15' of valve 15.

When rod 32 is forced to the right, by spring 34, collar 32e engages rolls 37a to rotate lever 37 clockwise, thus engaging rolls 37b with collar 15b and forcing plunger 15' to the left into the position shown in Fig. 10 communicating port 38' with supply conduit 16, and port 18' closed.

When rod 32 is forced to the left, by spring 33, collar 32d engages rolls 37a to swing lever 37 anticlockwise engaging rolls 37b with collar 15a, forcing plunger 15' to the right into the position shown in Fig. 8 with port 39' communicating with supply conduit 16, and port 17' closed.

Conduit 38, leading from port 38', connects with reverse valve 40, and conduit 39, leading from port 39' also connects with reverse valve 40.

Conduit 38a, leading from reverse valve 40 to the right hand end of cylinder 41, supplying pressure fluid for forcing piston 41' to the left. When port 38' in valve 15 is communicating with supply conduit 16, as reverse valve 40 normally connects conduit 38 with conduit 38a, and conduit 39 with conduit 39a leading to the left hand end of cylinder 41. When port 39' registers with port 16' of valve 15, as shown in Fig. 8 fluid flows to the left hand end of cylinder 41 to force piston 41' to the right.

Rack 41a, in mesh with gear segment 42, is fastened to piston rod 41", which is integral with piston 41', so that segment 42 rotates clockwise when piston 41' is forced to the left and anticlockwise when piston 41' moves to the right.

The segment 42 is freely mounted on shaft 43' and lever 43 is fast on shaft 43'. Blocks 42a and 42b, are respectively mounted in slots 42c and 42d, being adjustable therein, and extend forward in a manner to engage lever 43, as segment 42 swings in either direction, to turn lever 43 and shaft 43' in the direction of the segment travel.

Blocks 42a and 42b may be adjusted into any position in their respective slots to swing lever 43 as far as desired in either direction, or adjusted to the extreme outer ends of their slots out of engagement with lever 43, in which case this lever may be adjusted by hand.

Shaft 43' operates a servo valve, not shown, for governing the speed and direction of travel of hydraulic transmission 44, which is driven by motor 45. The gear 44a, is fast on transmission shaft 44' and meshes with idler gear 44b which, in turn, meshes with gear 44c, which is fast on, and drives, cutter spindle 10. The servo valve and transmission mentioned above form no part of my invention and are therefore not fully described.

When lever 43 is swung to the right, cutter spindle 10 is rotated in an anticlockwise direction as viewed in Fig. 1, and when lever 43 is swung to the left the cutter arbor is rotated in a clockwise direction, as viewed in Fig. 1.

When blocks 42a and 42b are set in position to swing lever 43 to its extreme outer positions transmission 44 is operated to impart full speed to the cutters and when lever 43 is in its central zone there is no rotation of the cutters, so that the speed of the cutters is accelerated as lever 43 is moved away from its central zone in either direction.

When blocks 42a and 42b are adjusted to their extreme outward positions, so that they do not contact lever 43, this lever may be set into any position of its range on either side of its central position to select any desired speed of the cutters in either direction, in which case the cutters will rotate in one direction until lever 43 is again adjusted.

The cutter spindle head 11 and transmission 44 are firmly attached to each other and head 11 is adjustably mounted on ways 11a, formed on the framework of the machine to adjust the position of the cutters with relation to the work. Head 11 is held in the desired position by clamp bolts, as shown, and the whole assembly, including cylinder 41, rack 41a, and transmission 44 are raised and lowered to any desired position by the hoisting cylinder 46. The piston 46' is in the form of a stem extending downward from the under side of transmission 44 into cylinder 46. The conduit 46a is connected between supply conduit 16 and the lower end of cylinder 46 to supply pressure to raise the cutter drive assembly when valve 46c is opened, and exhaust conduit 46b connects cylinder 46 with tank 14 for lowering the cutters when valve 46d is opened.

As rack 41a moves to the right the cam surface 41b formed thereon engages lever 47, fast on shaft 47', to rock lever 47 clockwise (see Fig. 24) and as spiral gear 47" is fast on shaft 47' gear 47" is rotated clockwise. This gear is in mesh with spiral gear 48, fast on shaft 48'. Lever arm 48" is also slidably keyed to shaft 48' and is pivoted at its outer end to connecting rod 48a. Rod 48a is pivoted at its opposite end to arm 49, fast on shaft 49'. Forked lever arm 50 is also fast on shaft 49' and rolls 50', freely mounted on the ends of forked lever 50, are in position to engage collars 51a and 51c fast on rod 51" which is integral with plunger 51' of automatic stop valve 51, the office of which will be described later.

Forked lever 52 is also fast on shaft 49', and its forked ends carry rolls 52', freely mounted thereon. Rolls 52' are in position to engage collars 15b and 15c fast on rod 15", which is formed integral with plunger 15' of valve 15.

Figure 3:
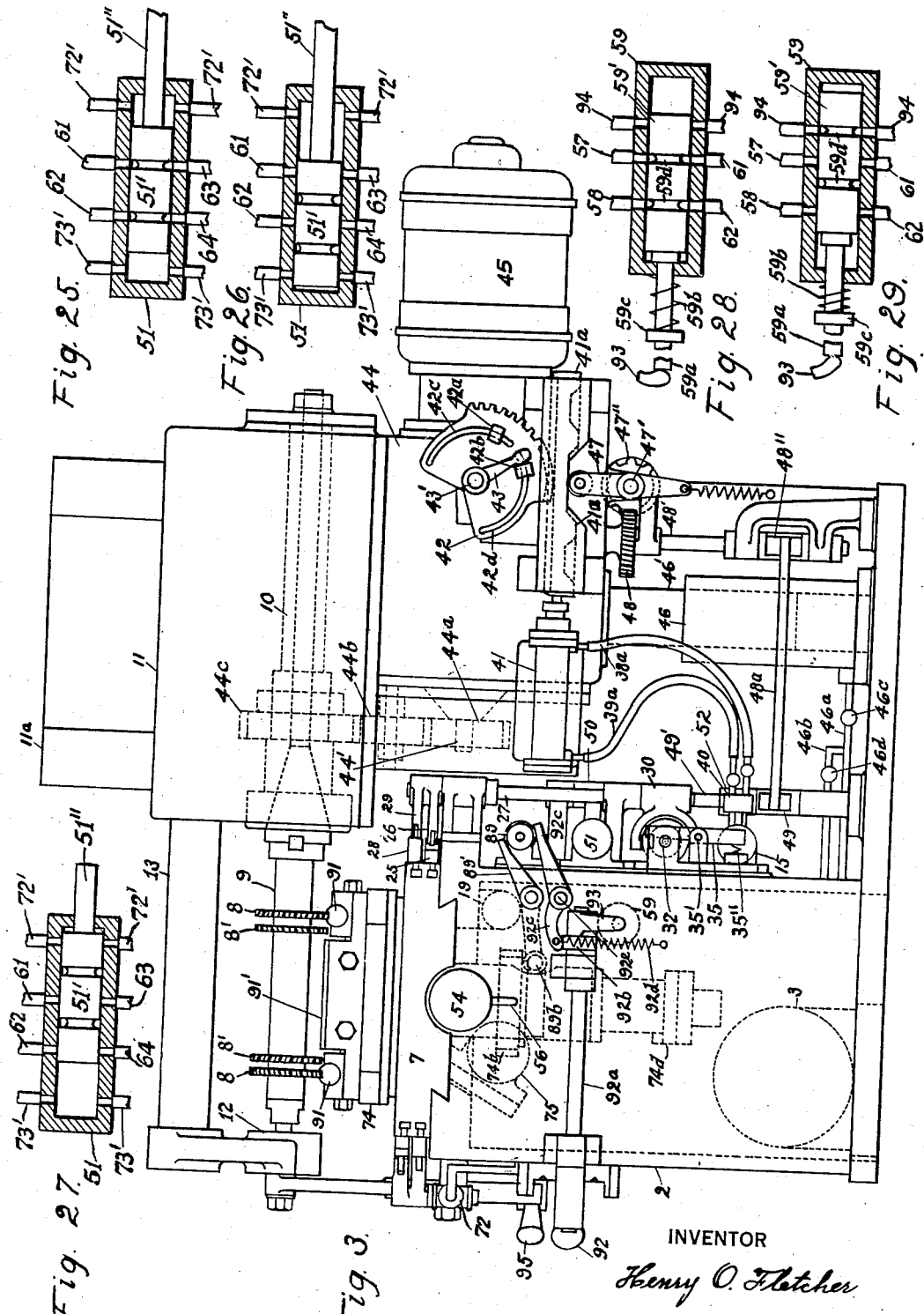

The teeth of spiral gears 47" and 48 are made of right-hand spiral form so that when rack 41a moved to the right, as viewed in Figs. 3 and 4, forked levers 50 and 52 will force rods 51" and 15", respectively, to the right, as viewed in Fig. 5.

As stated above, the tripping of levers 26 and 29 by dogs 25 and 28 imparts sufficient movement to valve plunger 15' to uncover ports 38' and 39' for operating rack 41a, segment 42 and lever 43 to reverse the cutter rotation, and operating the mechanism described in the two preceding paragraphs, for imparting further movements to plunger 15' to connect ports 17' or 18' with supply conduit 16 for operating table 7.

The cycle is as follows: As table 7 approaches the end of its movement to the right, as viewed in Fig. 2, dog 25 operates lever 26 and the above described load and fire device to set plunger 15' into the position shown in Fig. 8, connecting conduit 39 with supply conduit 16, which operates rack 41a to the right, reversing the rotation of the cutters, causing them to rotate anticlockwise as viewed in Fig. 1, and also further operates plunger 15' into the position shown in Fig. 9, connecting conduit 17 with conduit 16 for propelling table 7 to the left as viewed in Fig. 1.

As table 7 approaches the end of its movement to the left as viewed in Fig. 1, dog 28 operates lever 29 to propel plunger 15' into the position shown in Fig. 10, connecting conduit 38 with supply conduit 16 which propels rack 41a to the left again reverses the rotation of the cutters into a clockwise rotation as viewed in Fig. 1, and cam surface 41c, formed on rack 41a, operates lever 43 into the position shown in Fig. 23 to further propel plunger 15' to the left, into the position shown in Figs. 4 and 11, connecting conduit 18 with conduit 16 for propelling table 7 again to the right as viewed in Fig. 1.

Piston 55 is slidably mounted in cylinder 54, (see Fig. 4) and the rod 55', of piston 55 is connected to table 7 as shown in a manner to control the movements of table 7.

The conduit 53 leads from the right hand end of cylinder 54 to port 53' in compensating valve 19, and conduit 56 leads from the left hand end of cylinder 54 to port 56' in compensating valve 19.

Conduit 57 leads from port 57', in valve 19, to port 57'' in the manually operated stop valve 59, and conduit 58 leads from port 58', in valve 19, to port 58'' in valve 59. Conduit 61 leads from port 61', in valve 59, to port 61'' in the automatic stop valve 51, and conduit 62 leads from port 62', in valve 59, to port 62'' in valve 51.

Conduit 63 leads from port 63' in valve 51 to the hand control valve 63'' and thence through check valve 63a to conduit 64. Conduit 64 leads from port 64', in valve 51, to hand control valve 64'' thence through check valve 64a to conduit 63.

Plunger 19', of valve 19, when in its normal position, allows free flow of fluid from port 53' to port 57', and also from port 56' to port 58'.

Plunger 59', of valve 59, when in its normal position, allows free flow of fluid from port 57'' to port 61' and also from port 58'' to port 62'. Plunger 51', of valve 51, when in its normal position, allows free flow of fluid from port 61'' to port 63', and also from port 62'' to port 64'.

By this it will be seen that fluid may flow freely from one end of cylinder 54 to the other if valves 63'' and 64'' are open, but these valves govern the flow to regulate the feeding speed of piston 55, and consequently of table 7.

Valve 63'' regulates the speed when table 7 is traveling to the right as viewed in Fig. 4, or to the left as viewed in Fig. 1, and valve 64'' is used to govern the movement when the tabe is moved in the opposite direction.

Valves 65, in conduit 17, and valve 66 in conduit 18, are used to influence the flow of fluid in the pressure system in a manner that will be explained later.

Valves 63'', 64'', 65 and 66 may all be adjusted at the same time by rack 67 which meshes with pinions 67' fixed to the regulating devices of these valves. The stems of these valves extend through the framework of the machine as shown in Figs. 1, 20 and 21, and are all of similar construction.

Valve 66, represented in Fig. 20, has a long stem 66' on which pinion 67' is adjustably mounted.

The set screw 67b is used to adjust stem 66', and therefore the amount of opening of valve 66. The hand wheel 66'', fast on stem 66', is used to turn stem 66' when adjusting the valve. The large hand wheel 65'', mounted on the hub of pinion 67', is used to adjust all the valves an equal amount at the same time, this affording a very simple, convenient and speedy adjustment of the feed even when the machine is in operation. Rack 67 may be arranged to adjust any two or more of these valves as desired.

When piston 55 is traveling to the left, as viewed in Fig. 4, more fluid will be displaced than when traveling to the right, by reason of the volume taken up by connecting rod 55'.

It is therefore necessary to adjust valve 64'' to allow more fluid to pass than passes valve 63'' in order to obtain equal speeds in both directions of table travel. Also when fluid is flowing from the left hand end of cylinder 54 there will not be capacity in the right hand end to allow all of the fluid to enter, therefore relief valve 68 and conduit 68' are provided to allow this excess fluid to flow to tank 69.

When piston 55 travels to the right there will not be enough fluid leaving the right hand end of cylinder 54 to fill the left hand end, and suction conduit 70 is provided with check valve 70' to allow sufficient fluid to flow from tank 69 to supply this deficiency. Check valves 63a and 64a are provided to prevent fluid from flowing freely from either side of the circuit to the other, or to the tank, except when desired.

From the foregoing it will be evident that either of these valves, 63'' or 64'', may be opened more than the other to speed up the flow of fluid in one direction or the other which will result in a greater, or faster, feeding movement of the table in one direction than the other, thus providing two different feeding speeds for the table.

The conduit 72', containing valve 72, connects conduit 62 with conduit 61 through the right hand end of automatic control valve 51, shunting valve 63', and, conduit 73', containing valve 73 connects conduit 61 with conduit 62 through the other end of valve 51, shunting valves 64''. These conduits are used to allow free flow of fluid from one end of cylinder 54 to the other for accelerating the table movement when no cutting operation is taking place, which will be explained later.

Conduit 72', having valve 72, connects conduit 62 with conduit 61, and conduit 63, having valve 63'', also connects conduit 62 with conduit 61 through conduit 64 and valve 51. Valve 63'' is manually adjusted to determine the speed of feeding movement of table 7 to the right, as viewed in Fig. 4, and has no influence over the speed of table movement to the left, as no fluid can pass through check valve 63a. If valve 63'' is adjusted to impart a slow feeding movement of table 7 to the right, and at some interval in said movement, valve 72 is slightly opened the feeding speed will be increased, and if valve 72 is again closed, the feeding speed will be decreased. These changes in speed during unidirectional feeding movement are effected by dogs mounted in the table slots, as already described, and are utilized to increase the speed of feed when a light cut is in progress by the cutter and to diminish speed when the cutter encounters a heavy portion of the work.

As the same conditions apply to valves 73 and

64″ when the table is feeding to the left the feed in that direction may be similarly changed by operating valve 73. Thus a varying feed may be obtained in one direction and a constant feed in the opposite direction, a varying feed in both directions, or a varying feed in one direction and a quick return in the opposite direction, as may be desired.

It is to be understood that, when using valve 72 or valve 73 in this way for unidirectional variation of feeding movement, these valves are to be closed during the return stroke in order not to interfere with the speed in that direction.

The turret 74, while not necessary for all kinds of work, is preferably employed for mass production to facilitate the introduction of the work to the cutters. Turret 74 is mounted on table 7, and keys 74′, set in the table are adapted to engage keyways 74″ formed in the lower surface of the turret table. When the turret is lowered into working position these keys extend into keyways 74″ being a perfect fit therein, to hold the turret firmly in position for the cutting operation.

When turret 74 is raised the lower surface of the turret table slightly clears the tops of keys 74′ to allow free rotation of the turret.

The turret spindle 74a extends downward through a bearing formed in the table to which gear 74b is keyed, a sufficient space being allowed for raising the turret without interference of the gear with the bearing. Hydraulic motor cylinder 75 is attached to table 7 and partakes of the movements thereof. Piston 75′, having rod 75″, is adapted to reciprocate in cylinder 75. Rack teeth are cut on the side of rod 75″, which mesh with gear 74b, for rotating turret 74 in either direction as piston 75′ travels in cylinder 75.

The depending rod 74f is fastened to the lower end of spindle 74a and piston 74c is formed thereon. The cylinder 74d is supported by bracket 74e attached to the lower side of table 7. Piston 74c extends into cylinder 74d and is raised and lowered by hydraulic pressure as will presently be explained.

Passage 6′, is formed in piston rod 6, and extends through piston 5 to chamber 4′ in cylinder 4, and passage 6″ is formed in rod 6, and is connected with chamber 4″ in cylinder 4 by short passage 6a. Conduit 6b is connected with passage 6′ and also to chamber 76′ in double reverse valve 76, and conduit 6c connects passage 6″ with chamber 76″ of valve 76. Conduit 76a connects chamber 76b, in valve 76, with the lower end of cylinder 74d, and conduit 76c connects chamber 76d in valve 76 with the upper end of cylinder 74d. Conduit 77 connects chamber 77′ with cylinder 74d at a point just above the lower end of piston 74c when in its lower position, but below piston 74c when raised to raise turret 74. Conduit 77″ connects chamber 77a in valve 76 to the upper end of cylinder 74d. Conduit 77b connects chamber 77c in valve 76 with the left hand end of cylinder 75, and conduit 77d connects chamber 77e in valve 76 with the right hand end of cylinder 75.

Passage 78′ in rotor 78, of valve 76 connects chamber 76′ with chamber of 76b, and passage 78a connects chamber 76″ with chamber 76d when rotor 78 is in the position shown in Figs. 14 and 17; but, passage 78′ connects chamber 76″ with chamber 76b, and passage 78a connects chamber 76′ with chamber 76d when rotor 78 is in the position shown in Fig. 16.

Rotor 78 is shown in Fig. 4 in the same position as illustrated in Fig. 16 with chamber 76″ connected to chamber 76b and chamber 76′ connected with chamber 76d therefore the pressure fluid flows from chamber 4′ of cylinder 4 through conduits 6b and 76c to the upper end of cylinder 74d providing pressure to hold turret 74 firmly down to its seat and tightening its contact with keys 74′.

When piston 75′ is propelled to the right turret 74 is rotated anticlockwise, and when it is propelled to the left the turret rotates clockwise as viewed in Fig. 2.

The wings 79 and 79′ extending downwardly from the hub of gear 74b are adapted to turn lever 79a into the position shown in Fig. 16 when gear 74b is rotated anticlockwise, and into the position shown in Fig. 17 when rotated clockwise, which reverses the flow of all the circuits passing through valve 76 each time that turret 74 is indexed.

When table 7 reaches the end of its movement to the left, as viewed in Fig. 4, plunger 15′ will be shifted, first to the position shown in Fig. 8, which opens port 39′ to operate the device for reversing the cutter rotation and also the mechanism for shifting plunger 15′ into the position shown in Fig. 9 with pressure fluid applied to port 17′ for reversing the movement of table 7, but table 7 is held from its movement to the right, by means which will appear later in the description, until turret 75 has been indexed and lowered. This reversing of valve 15 reverses the pressure flow in the circuit composed of conduits 6b, 76c, 6c and 76a, resulting in pressure being applied to the lower end of cylinder 74d which raises piston 74c and turret 74.

As piston 74c is raised the port leading to conduit 77 is uncovered allowing pressure fluid to flow through conduit 77 to chamber 77e, through passage 80, to conduit 77d to the right hand end of cylinder 75 to index turret 74 clockwise, as viewed in Fig. 2.

As turret 74 nears the end of its turning movement, wing 79′ engages lever 79a to reverse valve 76, which applies pressure again to the top of piston 74c for lowering turret 79 to its seat, and to firmly hold it down for the cutting operation.

The dash-pot piston 78b, extending downwardly from piston 74c fits into dash-pot 78a, and conduit 78c connects the lower end of dash-pot 78a with the lower end of cylinder 74d, valve 78e being interposed in conduit 78c for regulating the flow of fluid between dash-pot 78a and cylinder 74d. The conduit 78d is connected in a manner to shunt valve 78e, the check valve 78f preventing flow in the shunt conduit from the dash-pot to the cylinder, compelling it to flow through valve 78e which is adjusted to regulate the fluid flow to lower piston 74c and turret 74 at any desired rate of speed to prevent a sudden drop of the massive turret. The check valve 78f allows the fluid pressure to enter dash-pot 78a to assist in raising the turret.

As rotor 78 is turned the pressure flow is reversed in conduit 77b and 77d twice, once in the upper and once in the lower portion of valve 76, which leaves the pressure in the same direction as though it had not been reversed, with pressure still applied to the right hand end of cylinder 75 to complete the index movement.

As rotor 78 turns to its central position the flow of fluid is momentarily cut off which would prevent the exhaust flowing from cylinder 75. This sudden cut off of exhaust would cause a sudden and extreme piling up of pressure in the exhaust end of cylinder 75 due to the momentum of turret 74, if it were not for the hydro-pneumatic pressure chambers 90 and 90' connected with conduit 77b and 77d, respectively, to relieve this excess pressure. The pressure valve 90a regulates the pressure of chamber 90 and pressure valve 90b regulates the pressure of chamber 90'. These chambers are partly filled with liquid when the pressure in the exhaust occurs, a part of which is retained, as the valves only allow fluid above the pressure to which they are set to pass in either direction. As will be seen this piling up of exhaust pressure assists to overcome the momentum of the turret when stopping its movement.

When table 7 reaches the end of its return movement to the right valve 15 is reversed which again reverses the pressure, applying it to the lower end of cylinder 74d to raise turret 74 and as all the circuits of fluid flowing to cylinder 75 were reversed when turret 74 was indexed, pressure fluid flows through conduit 77b to propel piston 75' to the right to again index turret 74, but in the opposite direction.

It will be seen, by the foregoing, that as table 7 moves in one direction one or more cutters are revolving properly to operate on the work in that direction, and, as table 7 returns, one or more cutters are revolving properly to operate on the work for that direction.

Referring to Figs. 30 and 31, the conduit 6b is connected to ports 200 and 201, and conduit 6c is connected to ports 213 and 214 of valve 202. Valve 202 and motor 75 are attached to, and travel with, table 7.

In the position of the parts as shown in Fig. 31, piston 5 and table 7 have finished their movement to the right, valve 15 has been operated to furnish pressure through conduit 23 to propel table 7 to the left, but as explained above it has been held from this movement until the turret has been raised and indexed.

In this instance pressure has passed through conduit 6b and port 200 to conduits 204 and 205, to the lower end of cylinder 74d to raise turret 74, valve plunger 203 having been in the position shown in Fig. 31.

Fluid pressure also has passed through conduit 206, and check valve 220, and conduit 78g to the left end of cylinder 75 to propel piston 75' to the right for indexing turret 74.

As piston 75' nears the end of its travel to the right the lug 207, adjustably attached to rod 208, fastened firmly to the end of piston rod 75'', engages lug 209 fastened to rod 210, which is made integral with plunger 203, to move plunger 203 to the right as shown in Fig. 30.

This movement of plunger 203 to the right reverses the pressure in cylinder 74d to lower plunger 74c and turret 74 by connecting port 200 with port 215 of conduit 216 leading to the upper end of cylinder 74d, and also stops flow of fluid between conduits 78h and 6c by closing port 214, thus cutting off the flow of exhaust from cylinder 75 retarding the latter part of the indexing movement to bring the turret to a gradual stop, the high pressure relief valve 211, in conduit 212, allowing the excess pressure to flow through conduit 212 to tank 14.

With the parts in this position it will be seen that piston 75' is held from movement and piston 74c is held firmly down to lock turret 74 to its seat.

When table 7 reaches the end of its movement to the left the pressure is reversed in cylinder 4 again supplying pressure to conduit 6c, which is connected through port 213 to conduit 205 to the lower end of cylinder 74d raising piston 74c and turret 74. Pressure also passes through conduit 222 and check valve 223 to conduit 78h to the right end of cylinder 75 to index turret 74.

As piston 75 and rod 208 near the left end of their travel lug 207 engages lug 217, fast on rod 210, to propel plunger 203 to the left which closes port 201 to the exhaust fluid flowing through conduit 78g for retarding the end of the indexing movement of the turret as before, the excess pressure being relieved by the high pressure relief valve 218 in conduit 212a allowing the fluid to pass to tank 14 through conduit 212.

This movement of plunger 203 to the left reverses the pressure to cylinder 74d by connecting port 219 with port 213, thus supplying pressure through conduit 216 to the upper end of cylinder 74d to lower turret 74. When the table again reaches the end of its travel to the right the pressure is again relieved in cylinder 74d by supplying fluid through conduit 205 to raise turret 74.

Table 7 has just finished its movement to the right as viewed in Fig. 1, and the work indicated by numeral 91 has been operated upon by cutter 8, turning clockwise. Work 91' will be operated upon by cutter 8', turning anticlockwise on the return stroke. Work 91' is placed nearer to the center of turret 74 than work 91 which brings it into line with cutters 8' for operation thereon. In other words cutters 8 and work 91 are farther apart, and in line with each other, but clearing cutters 8', and work 91' and cutters 8' are nearer together also bringing them in line, which clears work 91' from cutter 8.

When table 7 has traveled sufficiently to the right to complete the cutting operation (see Figs. 1 and 2), dog 81 adjustably mounted in slot 81', formed in the table, engages lever 82, fast on the stem of valve 72, to open valve 72, thus shunting the fluid circuit between the ends of cylinder 54, to accelerate the table movement; and, on the return stroke, as the work approaches the cutters, dog 81a, adjustable in slot 81b, engages lever 82a, on the stem of valve 72, to again close this valve slowing down the table to the feeding movement. Dogs 83 and 84 respectively engage levers 83' and 84' fastened to the stem of valve 73 for similarly stepping up the speed of the table between the end of one cutting operation and the beginning of the next.

When forked lever 50 engages collar 51a to move plunger 51', of automatic valve 51, to the right, as shown in Fig. 27, passage of fluid is cut off from either end of cylinder 54, locking piston 55 against movement, and also cuts off flow of fluid in conduit 72' and when lever 50 engages collar 51b to move plunger 51' to its left hand position, as shown in Fig. 26, piston 55 is locked and the flow is cut off from conduit 73'.

When plunger 51' and rod 51'' are moved to the right collar 51a engages the lower arm of forked lever 85, fulcrumed at 85' on the framework of the machine, turning lever 85 anticlockwise, and engaging its upper forked arm with collar 86 fast on rod 86' which slides within tube 86a. This tube is fixed in the clamp bearings 86b.

Mounted within tube 86a are two compression springs 87 and 87' which tend to hold rod 86' in its central position by engagement with collar 88, fast on rod 86', the springs being held under compression by the closed ends of tube 86a. The collar 89, fast on the left hand end of rod 86', is adapted to be engaged, at either side, by lever 89'. When rod 86' and collar 89 are in their left-hand position lever 89' may engage the right side of collar 89 as shown in Fig. 5 to prevent spring 87' from forcing rod 86' to the right of collar 89, and when rod 86' is in its right hand position lever 89' may engage the left side of collar 89, as shown in Fig. 6, to prevent spring 87 forcing rod 86' to the left.

Formed on the under side of the hub of gear 74b is shoulder 89a, and rod 89b, mounted rigidly between the ends of lever arms 89c and 89d, is held against shoulder 89a by springs 89e. Lever arms 89c and 89d are mounted fast on shafts 89f and 89g, respectively, which are freely mounted in the framework of the machine, and lever 89' is fastened to the outer end of shaft 89f.

When turret 74 is in lowered position rod 89a is lowered rotating shaft 89f and raising lever 89' to clear collar 89, and when turret 74 and gear 74b are raised springs 89e raise rod 89b, lowering lever 89' to engaging position with collar 89, to prevent rod 86' returning to its central position and maintaining plunger 51' in closed position.

When turret 74 lowers rod 89b releases lever 89' from collar 89, opening valve 51 which automatically unlocks piston 55 to allow movement to table 7.

When it is desired to retain table 7 at the end of its movement in either direction indefinitely, the operator presses lever 92 downward to the position indicated by dotted lines 92' which turns shaft 92a to which lever 92 is fastened, anticlockwise, as viewed in Fig. 1, thus turning cam 92b, fast on shaft 92a, out of engagement with the end of lever 92c, allowing spring 92d to swing the opposite end of lever 92c into engagement with collar 89, the lever 92c being fulcrumed at 92e in the frame of the machine and spring 92d, connected between the cam engaging end of lever 92c and the framework, to swing lever 92c into engagement with collar 89. When it is desired to again start the machine lever 92 is raised to its normal, central position, which turns cam 92d into position to swing lever 92c out of engagement with collar 89 allowing rod 86' to assume its central position opening valve 51 to allow movement of table 7.

When the machine has to be stopped, in case of emergency, lever 92 is raised to the upper position indicated by dotted lines 92" turning shaft 92a clockwise which forces plunger 59', of hand stop valve 59 into the position shown in Fig. 29 by the engagement of lever arm 93 fast on shaft 92a with plunger rod 59a formed on plunger 59'. When plunger 59' is in this position fluid flow is cut off between conduits 58 and 62, and also between conduits 57 and 61, locking piston 55 against movement and holding table 7 stationary.

When plunger 59' is in this position the annular recess 59d, formed in plunger 59', registers with the shunt conduit 94, which is connected between conduits 17 and 18 thus allowing free flow of fluid between these conduits for releasing pressure from both ends of cylinder 4.

When it is again desired to start the machine lever 92 is again moved into its central position which releases lever 93 from plunger rod 59a allowing spring 59b, mounted between valve 59 and collar 59c, fast on rod 59a, to force plunger 59' into its normal position, as shown in Fig. 28, again allowing free flow of fluid between the ends of cylinder 54 and cutting off flow in shunt conduit 94 which renders the circuit in conduits 17 and 18 again operable with relation to cylinder 4.

When in an emergency case, it is desired to reverse the movement of table 7, lever 92 is raised to position 92" and lever 95 fast on shaft 95a connected to reverse valve 22 as shown in Fig. 45, is turned into the position shown by dotted lines 95' which operates reverse valve 22 to reverse the pressure in cylinder 4, reversing the movement of piston 5 and table 7. When table 7 has traveled sufficiently in reverse direction lever 95 is again turned to horizontal position, and when it is desired to again start the machine lever 92 is again turned to central position.

If it is desired to use the machine for hook, or climb, milling, the cutter may be turned on the arbor as usual to hook into the work. Reverse valve 40 is set to reverse the flow of fluid in conduits 38a and 39a reversing the direction of travel of rack 41a to reverse the rotation of the cutters with relation to the table travel, levers 48" and 49 re-adjusted on shafts 48' and 49', respectively, as shown in Fig. 44, with connecting rod 48a connected between these levers as shown to maintain the valve operation as before described.

This is a hazardous undertaking with a hydraulically operated machine unless provision has been made to control the table movement to overcome the extremely forcible pulling ahead of the table by the teeth of the cutter as it feeds into the work.

To control the movement of the propelling piston under such conditions entails a complication of intricate valve, power, pump and mechanical devices which are expensive, complicated and unreliable. One of the chief difficulties lies in the fact that the area of the two ends of the piston are necessarily of different area which results in a change per square inch of pressure as one undertakes to control the piston movement by tampering with the exhaust fluid.

By the foregoing description it will be seen that cylinder 4 and piston 5 are only for the purpose of propelling table 7, and the areas of the two ends of piston 5 are not the same.

To illustrate, let us take a simple example: We will suppose that the diameter of piston rod 6 is one half the diameter of piston 5, then the area of rod 6 is one fourth of the area of piston 5 at its larger end. Then the remaining area of piston 5, at the rod end is ¾ that at the large end. If we apply a pressure of 1000 lbs. per square inch to the large end then the pressure per square inch exerted by the smaller end would be 4/3 × 1000 or 1333⅓ lbs. per square inch if the exhaust is closed and no power is absorbed. If we apply 1000 lbs. pressure per square inch to the small, or rod, end of the piston the pressure per square inch exerted by the larger end is three fourths of that exerted at the small end, or 750 lbs. per square inch under the same conditions as stated above. This being true the resultant pressure per square inch exerted by the piston at the end opposite to that of the power application varies in the ratio of 1333/750=1.78. The inverse ratio =750/1333=.5625.

By this we see that the resultant pressure per square inch at the ends of the piston opposite that to which the power is applied varies according to the above ratio, or under the conditions named above; the resultant pressure per square inch at the rod end is nearly twice that applied at the larger end, and conversely, the resultant pressure per square inch at the larger end is only a little over half of that applied to the rod end. This is wherein the difficulty lies.

To overcome this difficulty I employ a second cylinder and piston preferably of similar dimensions as those used to propel, using fluid at atmospheric pressure, so arranged, and connected with the propelled element that when pressure fluid is applied to the rod end of the propelling piston the rod end of the controlling piston will be in use to control the movement; and, when pressure is applied to the larger end of the propelling piston to propel the propelled element, the larger end of the controlling piston is used to control the resultant movement.

It will be seen by the above that there are two distinct hydraulic systems employed, a pressure system to propel the parts, and a non-gauge pressure system to control the feeding movements.

Cylinder 54 and all of the conduits of the second hydraulic system are completely filled with liquid so that there is at all times a rigid resistance to the movements of table 7 which greatly assists in stabilizing the feeding movement. This rigid resistance is obtained by the use of the independent fluid of the second system and cannot be obtained by using a single hydraulic system, the fluid of the second system being free from the vibrations of the first system.

By this arrangement a substantially proportional differential of ratios of pressure are set up between the cylinders which may be readily used to control any abnormal disturbance of this differential.

The compensating valve 19, partially herein described, combines a reversing valve for reversing the pressure in the two ends of cylinder 4, to stabilize the movement of piston 5, and an automatic stop valve for locking piston 55 against movement under the conditions described above.

Conduits 53 and 56, leading from the right and left hand ends, respectively, of cylinder 54, enter valve 19 through ports 53' and 56', respectively, which are very short, considered longitudinally of the valve, in order to effect a quick closing by the spools of plunger 19', and extend completely around the valve body to provide the necessary cross sectional area, (see Fig. 32) and ports 20' and 20", leading to conduit 20, and ports 21' and 21", leading to conduit 21 are of the same construction.

Conduit 96, containing check valve 96' is connected to conduit 56, leading from the left hand end of cylinder 54, and also to conduit 96a connected to the chamber 96b in the left hand end of valve 19, and conduit 97 having check valve 97' is connected between conduit 53, leading from the right hand of cylinder 54, and conduit 96a.

Conduit 98, containing check valve 98', connects with conduit 20, which leads from the left hand end of cylinder 4, through conduit 24, and also through conduit 98a, which is connected to chamber 98b in the right hand end of valve 19. Conduit 99, containing check valve 99' connects with conduit 21, leading from the right hand end of cylinder 4 through conduit 23, and to conduit 98a.

By this it will be seen that both ends of cylinder 54 are connected with the left hand chamber 96b, and that both ends of cylinder 4 are connected with the right hand chamber 98b of valve 19.

If the pressure in cylinder 4 could be transmitted without loss to piston 54, the resultant pressure in cylinder 54 would be equal to the pressure in cylinder 4, but there is always a loss in this transmission, due to inertia, friction and work done, so that under normal conditions the resultant pressure in cylinder 54 will always be less than those in cylinder 4, therefore the pressure exerted on the left hand end of plunger 19' from conduit 96a will be less than the pressure exerted on the right hand end from conduit 98a. The rod 19a extending from the right hand end of plunger 19 is made comparatively small in order not to reduce the area of and effective pressure on plunger 19' sufficiently to equalize these pressures. The compression spring 100 is mounted on rod 19a, between the body of valve 19 and the check nuts 101, which are threaded to rod 19a for the adjustment of spring 100. This spring is adjusted to almost, but not quite, equalize the forces acting in both directions on plunger 19', so that there will normally be a slight excess of force exerted to hold it in its left hand position with the ports leading to conduits 53 and 56 and ports 20' and 21' open, and ports 20" and 21" closed.

Ports 57' and 58' are normally open so that when plunger 19' is in its left hand position there is a free flow of fluid to and from cylinder 4 and to and from cylinder 54 allowing normal action of the machine without interference.

When the cutter enters the work during hook milling a force is applied tending to suddenly force the table ahead in the direction of its feeding movement due to the action of the cutter on the work, as explained above. This force under some conditions becomes enormous and if there is no provision made to check it the work will be drawn against the cutter supplying work beyond the ability of the cutter to handle, which may result in serious damage to the machine, cutter or work, or to all three at once.

When table 7 is suddenly drawn ahead pistons 5 and 55 are also drawn ahead of their normal movement resulting in a reduction of the pressure applied behind piston 4 and a sudden increase of the pressure applied in front of piston 55 which increases the pressure in chamber 96b forcing piston 19' to the right to close the ports leading from conduits 53 and 56 to lock piston 55 against movement.

Valves 65 and 66 are introduced into the conduits 17 and 18, respectively, and are adjusted to allow fluid flow sufficient for proper movements of piston 5, but are closed enough to produce a slight wire-drawing effect, when piston 5 is drawn ahead of its normal movement, to assist in reducing the pressure on the right hand end of plunger 19' in these emergencies, to hasten the action of plunger 19' in reversing the pressure to cylinder 4 and locking piston 55.

When the cutters have sufficiently cleared in the work the normal pressure differential set up in the two cylinders becomes normal, which again results in forcing plunger 19' to the left, resulting in normal working conditions of the machine.

If hook milling is not used, and if it is desired to guard against it, the adjusting rod 19a may be made to open an emergency switch, as shown in Figs. 57 and 56, when the cutter is assembled wrong in relation to the work. The switch button is in proximity to the end of rod 19a and the main lead 100', supplying the motors with power leads to block 100a with switch 101a normally closed connecting the supply main 100' with line 101c leading to the rheostats of motors 1 and 45 for supplying current to drive these motors. When plunger 19' is forced to the right as the result of a fluctuation of the table, switch 101a is opened, as shown in Fig. 56, cutting off the current and stopping the machine.

The movement required of plunger 19' to open and close the various ports is very slight due to the short length of the ports and the plunger may be made of a light alloy, and hollowed out, as shown in Fig. 32, to reduce inertia for a very quick action of the plunger resulting in momentary regulation of the machine.

The valve 102 illustrated in Fig. 12 is in all respects like valve 19, except that the automatic stop portion is omitted, and valve 103, shown in Fig. 13, is similar to valve 19, except that the servo-valve portion is omitted. Either of these two valves will regulate the movements of the table when hook milling is used, but I have combined the two into one valve to make surety doubly sure under the conditions mentioned above.

The operation is as follows: As table 7 reaches the end of the cutting operation to the left as viewed in Fig. 4, valve 72 is opened to accelerate the table movement. The main valve piston is operated to the right, as shown in Fig. 8, sufficiently to operate the cutter reversing mechanism, and the automatic stop valve to stop position, locking piston 55 and table 7 against movement, closing conduit 72', and further operating the main valve to the right, as shown in Fig. 9, to supply fluid to the left hand end of driving cylinder 4 to return table 7, but, as it is locked against movement the pressure is transmitted through passages 6a and 6'' and conduit 6c to raise and index the turret. As the turret raises the automatic stop valve is locked in stop position and as the turret lowers automatic stop valve is released to allow the return movement of the table to the right. As the work approaches the cutter valve 72 is closed and the table is propelled at a feeding rate through the work when valve 73 is opened, accelerating the movement. At the end of the table movement to the right the main valve is operated to the left as shown in Fig. 10, to again reverse the cutter rotation, operate automatic stop valve to stop position, closing conduit 73, raising and indexing the turret as explained above, lowering the turret and releasing the stop valve to again return the table to the left. As the work approaches the cutter valve 73 is closed for feeding movement and the cycle of operation is repeated automatically.

The machine may be used without indexing the turret by closing valves 6e and 6d, which eliminates the raising, lowering and rotating of the turret, by mounting one piece work in proper position for operation by one cutter as the table travels in one direction, and another piece in position for operation by another cutter as the table travels in the opposite direction, the machine operating in the same manner as if the turret was eliminated, and the work mounted directly on the table.

In this case the movement of table would not be arrested at the end of its stroke unless lever 92 was operated for this purpose, as explained above.

It if is desired to use the machine as a plain milling machine cutting in one direction of the table movement only the necessary adjustments to be made are, to adjust blocks 42a and 42b to the outer ends of slots 42c and 42d, set lever 43 in position to effect the desired direction of rotation and speed of the cutters, and close valve 6e in conduit 6c to prevent the raising and indexing of the turret, leaving valve 6d open to supply pressure to the upper end of cylinder 74d to hold the turret down to its seat, if the cutting operation is to take place during movement of the table to the left, as viewed in Fig. 4; but, if the cutting operation is to take place during table movement to the right, valve 6d in conduit 6b is closed and valve 6e left open. To effect quick return of the table the dog 81 is adjusted in slot 81' to open valve 72 at the end of the cutting operation, and dog 81a is adjusted to close valve 72 at the end of the return stroke, dogs 83 and 84 being removed and valve 73 closed in case the cutting operation takes place during movement of table 7 to the right as viewed in Fig. 1, and dogs 83 and 84 are adjusted to open valve 73 at the end of the cutting operation and close it at the end of the return stroke if cutting takes place during movement of the table to the left.

The embodiment illustrated in Figs. 46 to 55 is similar in many respects to the previously described one, the principal difference being the manner of applying the cutter to the work.

In this embodiment the rotation of the cutters is not reversed, but oppositely revolving cutters are alternately brought into position to operate on the work as the table feeds in opposite directions.

The cutter head 11' is adjustably clamped to ways 11a and transmission 44d is firmly attached to cutter head 11' and driven by motor 45'.

Transmission 44d is similar to transmission 44, except that the direction of rotation is reversed and speed governed by turning hand wheel 44b instead of being done automatically.

To the transmission shaft 44e is keyed gear 102 which meshes with intermediate gear 103, which in turn meshes with gear 104, fast on shaft 105, extending back to the rear of the machine. To the rear end of this shaft is keyed the gear 106, which drives gear 107 fast on spindle 108 through geared belt 109.

The hollow main driving spindle 108 is rotatably mounted in the spindle bearing 110' which in turn is freely mounted in the rear end of head 11'. This rear bearing is attached to the front bearing 110 by means of bolts 111 and 111'.

While I have shown a geared belt to drive spindle 108 any suitable means may be employed to drive this spindle, such as a silent chain, or sprocket chain together with suitable sprockets, or an ordinary belt and suitable pulleys, or other belt means.

Rotatably mounted in bearing 110 are spindles 112, 113 and 114, spindle 112 being in alignment with driving spindle 108. Gear 115 is fast on the inner end of spindle 108', slidably keyed in hollow spindle 108, and clutch member 115' is made integral with gear 115, and is adapted to engage clutch member 112' fast on spindle 112, when sliding spindle 108' is advanced to the position shown in Fig. 51, and disengaged from member 112' when spindle 108' is withdrawn. The annular grooves 118a and 118b are formed on the rear end of spindle 108' and segments 118c, removably attached to the end of sprocket 107, extend into one or the other of these grooves to hold spindle 108' in the desired position.

Gear 116 fast on spindle 113 meshes with gear 115 when gear 115 is in the position shown in Fig. 50, and gear 116' also fast on spindle 113 meshes with intermediate gear 117 freely mounted on stud 17' which stud extends between spindle bearing 110' and front spindle bearing 110.

Gear 117 meshes with intermediate gear 118 freely mounted on stud 118', and gear 118 in turn meshes with gear 119' fast on spindle 114.

Thus the spindle 108 centrally located in rear spindle bearing 110' drives the two cutter spindles 113 and 114, in opposite directions to each other, when gear 115 is in mesh with gear 116', and spindle 108 drives the central spindle 112, when gear 115 is in the position shown in Fig. 51, out of mesh with gear 116 and the two clutch members are engaged with each other.

Arbors 120 and 121, on which cutters 120' and 121' are respectively mounted, are rotated in opposite directions, respectively, by spindle 113 and 114 as shown in Fig. 50, and arbor 122, on which cutters 122' are mounted is driven by spindle 112.

In this manner it will be seen that the single arbor, or the two oppositely rotating arbors, may be used at will, the single arbor when the machine is used as a plain milling machine, and the pair of oppositely revolving ones when used for mass production.

Valve 15 operates rack 123' attached to piston 123 reciprocating in cylinder 124, in a similar manner as piston 41' operates rack 41a, by pressure fluid flowing through conduits 38a and 39a (see Fig. 48), the main difference being that cylinder 124 is in an upright position. Gear teeth 125 are formed on spindle bearing 110, and mesh with gear 126 fast on shaft 126'. Gear 127 is also fast on shaft 126' which is journaled in housing 128. Gear 127 meshes with rack 123' so that when piston 123 is raised rack 123' rotates gears 126 and 127 anticlockwise, as viewed in Fig. 46, rotating spindle bearings 110 and 110' clockwise for half a revolution which brings cutters 120' into position to operate on the work and cutters 121' out of working position. When rack 123' is lowered spindle bearings 110 and 110' are rotated anticlockwise bringing cutters 121' again into working position and raising cutters 120' to clear the work.

By this movement cutters revolving in opposite direction are alternately brought into working position to operate on the work as the table is alternately propelled in opposite directions.

The bars 129 and 130 connect spindle bearing 110 with the outboard arbor bearing 131 in which are mounted the steady bearings 133, 134 and 135 for respectively supporting the outer ends of arbors 120, 121 and 122.

By the above it will be seen that spindle bearings 110' and 110 and also outboard bearing 131 are rotated at the same time in one direction or the other by rack 123'.

The lug 136 firmly attached to spindle bearing 110, engages stop 137 attached to the inside of cutter head 11', as shown in Fig. 53, when cutters 120', driven by spindle 113, engage the work, lug 137 acting as a buttress to prevent vibration in spindle carrier 110. Lug 138, set in the opposite side of spindle bearing 110, engages stop 139 when the cutters driven by spindle 114 engage the work for the same purpose, as shown in Fig. 52.

When lug 136 engages stop 137, lug 138 engages stop 140 attached at the top to inside of cutter head 11', and when lug 138 engages stop 139 lug 136 engages stop 141 attached in the upper side of head 11'.

Similar lugs are attached to the outward bearing 131 engaging stops set into the overarm 132 for preventing movement or vibration in outboard bearing 131 during the cutting operation.

All the other working parts of the last described embodiment are similar to those in the previously described embodiment.

Having described my invention, what I claim as new is set forth in the following claims:

1. In a machine tool, a cutter and an indexable work holder; means for translating one of said elements to effect cutting operations; means for indexing the work holder; means, including a hydraulic cylinder and piston, one of which is connected to the work holder, for raising the work holder from its seat after the cutting operation is completed, holding it in raised position during the indexing thereof, lowering it after the indexing movement is completed, and holding it down to its seat during the succeeding operation; means, operative by the movement of the translated element, for operating the third mentioned means to raise the work holder; means, operative by the raising movement of the work holder for indexing the work holder; means, operative by the indexing movement of the work holder, for operating the third mentioned means, to lower the work holder; and means, operative by the lowering movement of the work holder for operating the translating means, to translate the translated element.

2. In a milling machine, a cutter and a work holder; means, including a hydraulic motor, for translating one of said elements relative to the other to effect cutting operations on the work by the cutter; a cylinder, containing fluid normally under atmospheric pressure, and a piston for said cylinder, one of said parts being connected to the translated elements for controlling the movements thereof; and a valve, controlled by the differential between the initial pressure operating the hydraulic motor and the induced pressure set up in the controlling cylinder, for momentarily reversing the pressure from one end of the motor cylinder to the other to stabilize the movement of the translated element during disturbances occasioned by any abnormal increase of the feeding movement due to the action of the cutter teeth on the work when the cutter teeth travel in the direction of the feeding movement.

3. In a milling machine, a cutter and workholder; means, including a hydraulic motor, for translating one of said parts relative to the other to effect cutting operations; a cylinder and a piston one of which is connected to the translated part for controlling the movements thereof, the cylinder containing fluid normally at atmospheric pressure; and a valve, controlled by the differential between the initial pressure operating the hydraulic motor and the pressure set up in the controlling cylinder, for cutting off the flow of fluid in the controlling cylinder thus momentarily locking the controlling piston and the translated part against movement to prevent any abnormal increase of the feeding movement due to the action of the cutters on the work when the cutter teeth travel in the direction of the feeding movement.

4. In a milling machine, a cutter and workholder; means, including a hydraulic motor, for translating one of said elements relative to the other to effect cutting operations; a cylinder and a piston one of which is connected to the translated element to control the movements thereof, the cylinder containing fluid normally at atmospheric pressure; and a valve, operated by the differential between the pressure of the initial operating fluid and the pressure set up in the controlling cylinder, for momentarily cutting off flow of fluid in the controlling cylinder and reversing the pressure in the two ends of the hydraulic motor cylinder to stabilize the movement of the translated element during disturbances occasioned by any abnormal increase in the feeding movement due to the action of the cutter on the work when the cutter teeth travel in the direction of the feeding movement.

5. In a milling machine, an indexable work-holding element and a rotary, reversible cutter carrying element; means, including a first hydraulic motor, for reciprocating one of said elements to effect cutting operations in both directions of travel; means, including a second hydraulic motor, for reversing the rotation of the cutter carrying element; means, including a third hydraulic motor, for indexing the work-holding element; means, including a fourth hydraulic motor, for raising and lowering the work-holding element; a cutter, mounted on the cutter carrying element, adapted to operate on the work during movement of the reciprocating element in one direction and another cutter adapted to operate on the work during movement of the reciprocating element in the opposite direction; a locking device for locking the reciprocating element against movement during the indexing of the work-holding element; a hydraulic conduit system, including a valve for distributing fluid under pressure to the motors; means, operative by the movement of the reciprocating element, for setting the valve to reverse the rotation of the cutters; means, operative by the cutter reversing means, for setting the valve to reverse the movement of the reciprocating element, operating the locking device to prevent movement of the reciprocating element, supplying pressure to the first motor to reverse the movement of the reciprocating element and to the fourth motor to raise the work holder; means, operative by the raising movement of the work-holder, for operating the third motor to index the work-holder; means, operative by the indexing movement of the work holder, for lowering the work-holder; and means, operative by the lowering movement of the work holder, for operating the locking device for releasing the reciprocating element to allow movement thereof.

6. In a milling machine, a rotary, reversible cutter element and a work-holder; means, including a hydraulic motor for reciprocating one of said parts in a manner to perform a cutting operation on the work during its movement in both directions; a cutter carried by the cutter element adapted to operate on the work as the cutter element rotates in one direction, and a cutter carried by the cutter element, adapted to operate on the work, as the cutter element rotates in the opposite direction; means, including a cylinder and a piston, one of which is connected to the reciprocating part, the cylinder containing fluid normally at atmospheric pressure, for governing the movement of the reciprocating part in both directions; adjustable means for restricting the flow of fluid in either direction between the two ends of the governing cylinder as the piston reciprocates therein; means, operative by the movement of the work-holder in either direction, as the cutting operation is completed, for first adjusting said restricting; means, to increase the movement of the reciprocating part, and thereafter for reversing the rotation of the cutter element; means, operative by the cutter reversing means, for reversing the movement of the reciprocating part; and means, operative by the movement of the reciprocating part, as the cutter nears the work, for operating the restricting means to reduce the movement of the reciprocating part to feeding speed.

7. In a milling machine, a rotary reversible cutter element, and an indexable work-holder; means, including a hydraulic motor, for reciprocating one of said parts to effect a cutting operation in both directions of reciprocation; a cylinder and a piston, one of which is connected to the reciprocating part, the cylinder containing fluid normally at atmospheric pressure, for governing the movements of the reciprocating part; one cutter adapted to operate on the work as the cutter element rotates in one direction, and another cutter adapted to operate on the work as the cutter element rotates in the opposite direction; adjustable means for restricting the flow of fluid between the two ends of the governing cylinder as the piston reciprocates therein; means, operative by the movement of the reciprocating part after the cutting operation is completed in either direction, for operating the restricting means to increase the movement of the reciprocating part, and reverse the rotation of the cutter; means, operative by the cutter reversing means, for indexing the turret; means, operative by the indexing movement of the turret, for reversing the movement of the reciprocating part; and means, operative by the movement of the reciprocating part, for operating the restricting means, as the cutter approaches the work, to reduce the movement of the reciprocating part to feeding speed.

8. In a milling machine, a cutter and an indexable work-holder; means, including a hydraulic motor, for reciprocating one of said parts to effect cutting operations; a hydraulic piping system, including a valve for distributing fluid under pressure to the motor; means for indexing the work-holder; stop means, adapted to be set into stop and release positions, for preventing movement of the reciprocating part; means, operative by the movement of the reciprocating part, for operating the valve to arrest the movement of the reciprocating part, setting the stop means into stop position and indexing the work-holder; and means, operative by the indexing movement of the work-holder for setting the stop means into release position to allow movement of the reciprocating part.

9. In a milling machine, a cutter and a work-holder; means, including a hydraulic motor, for translating one of said parts to effect cutting operations; a cylinder and a piston, one of which is connected to the translated part, the cylinder containing the fluid normally under atmospheric pressure, for controlling the movements of the translated part; and a device for stabilizing the movement of the translated part, said device being operated by any abnormal fluctuation of the differential between the initial supply pressure and the induced pressure in the controlling cylinder due to the force exerted by the cutter teeth on the work when the teeth travel in the direction of the feeding movement.

10. In a milling machine, a cutter and a work support; means, including a hydraulic motor, for translating one of said elements to effect cutting operations; a piston and a cylinder, one of which is connected to the translated element, the cylinder containing fluid normally at atmospheric pressure, for controlling the movement of the translated element; the induced pressure in the controlling cylinder being less than the pressure for operating the hydraulic motor by reason of losses due to inertia, friction and work done; and a device for stabilizing the movement of the translated element, operative by any abnormal increase of pressure in the controlling cylinder relative to the pressure for operating the hydraulic motor due to the force exerted by the cutter teeth on the work when the teeth travel in the direction of the feeding movement.

11. Transmission means, including a hydraulic cylinder and a piston, one of which is operably connected to the table of a milling machine, for imparting movement thereto to effect cutting operations; a cutter spindle and a toothed cutter supported for rotation thereby in a manner to cause said teeth to travel in a direction to assist, or increase, said movement during the cutting operation; a hydraulic system for delivering fluid under pressure to said cylinder; a second cylinder, adapted to contain fluid under atmospheric pressure, and a piston, one of which is connected to the table to control said movement, a pressure differential existing between the two cylinders due to the induced pressure in the controlling cylinder being lower than the initial pressure in the first mentioned cylinder by reason of losses due to inertia, friction and work done; and a valve, controlled by said pressure differential, for momentarily reversing the pressure in the first mentioned cylinder, upon disturbance of said pressure differential due to any abnormal action between the cutter and work, when the teeth travel in the direction of the feed.

12. Transmission means, including a hydraulic cylinder and a piston, one of which is operably connected to the table of a milling machine, for imparting movement thereto to effect cutting operations; a cutter spindle and a toothed cutter supported for rotation thereby, the cutter teeth traveling in a direction tending to assist, or increase said movement during the cutting operation; a hydraulic system for distributing fluid under pressure to said cylinder; a second cylinder adapted to contain fluid under atmospheric pressure and a piston, one of which is connected to said table, for controlling said movement, a pressure differential existing between the two cylinders due to the induced pressure in the controlling cylinder being lower than the initial pressure in the first mentioned cylinder by reason of losses due to inertia, friction and work done; and a valve, controlled by said differential of pressures, for momentarily cutting off flow of fluid in the controlling cylinder to lock the table against movement upon disturbance of said pressure differential due to any abnormal action between the cutter and work.

13. Transmission means, including a hydraulic cylinder and a piston, one of which is connected to the table of a milling machine to impart movement thereto for effecting cutting operations; a cutter spindle and a toothed cutter supported for rotation thereby; a motor for rotating said spindle; a motor, pump and hydraulic piping system for distributing fluid under pressure to said cylinder; a second cylinder adapted to contain fluid under atmospheric pressure, and a piston, one of which is connected to said table for controlling said movement, a pressure differential existing between the two cylinders due to the induced pressure in the controlling cylinder being lower than the initial pressure in the first mentioned cylinder by reason of losses due to inertia, friction and work done; and a device operative by said pressure differential, for discontinuing the source of power for operating said motors and stopping the machine upon disturbance of said pressure differential due to any abnormal action between the cutter and the work.

14. In a milling machine, a cutter carrier, and a work-holder; means, for reciprocating one of said parts to effect a cutting operation on the work in both directions of reciprocation; a spindle mounted on the carrier for rotating a first cutter in one direction and a second spindle mounted on the carrier for rotating a second cutter in the opposite direction; means, for rotatably reciprocating the cutter carrier to bring one cutter into operation when the relative movement between the carrier and work-holder is in one direction, and the other cutter into operation when said relative movement is in the opposite direction.

15. In a machine tool, a cutter element and a work-holding element; means, including a hydraulic motor, having a cylinder and a piston, for translating one of said elements; a hydraulic cylinder and a piston, one of which is connected to the translated element, for governing the movement of said translated element, the cylinder containing fluid normally at atmospheric pressure; a hydraulic pressure system adapted to operate said hydraulic motor in such a manner that the rod end of the second mentioned piston will govern the movement of the translated element when pressure is applied to the rod end of the first mentioned piston, and the end opposite to the rod of the second mentioned piston will govern the movement of the translated element when pressure is applied to the end opposite the rod of the first mentioned piston, thus creating a substantially proportional ratio of pressure in the two cylinders.

16. In a milling machine, a cutter and an indexable work-holder; means, for translating one of said parts to effect cutting operations; means for indexing the work holder; means, including a hydraulic cylinder and a piston, one of which is connected to the work-holder, for raising the work-holder from its seat and holding it in raised position during indexing thereof, lowering it after the completion of the index movement and holding it down to its seat during the succeeding operation; a hydraulic system for distributing fluid to said cylinder; means operative by the movement of the translated element for supplying fluid to said cylinder to raise the work-holder; and means, operative by the indexing movement, for supplying fluid to said cylinder to lower the work holder.

17. In a machine tool, a cutter element and a work-holding element including a turret; means for translating one of said elements for cutting operations; a hydraulic pressure system; a hydraulic motor adapted to rotate the turret in opposite directions; and means, operative by the movement of the translated element, for controlling the pressure system to operate the hydraulic motor for alternately indexing the turret in one direction at the completion of one cutting operation, and in the opposite direction at the completion of the succeeding operation to present new pieces of work to the cutter for operation thereon.

18. In a machine tool, a cutter element and a work-holding table element including a turret mounted thereon; means for translating one of said elements for cutting operations; a hydraulic pressure system; a hydraulic motor, including a cylinder and a piston, one of said parts being connected to the table and the other to the turret, for raising the turret from the table and again lowering it to the table; and means, effective by the movement of the translated element at the completion of the cutting operation, for controlling the pressure system to operate the hydraulic motor for raising the turret to free it from the table, holding it in raised position to prevent friction with the table during indexing thereof, lowering it to the table at the completion of the indexing movement, and holding it in firm connection with the table during the succeeding operation.

19. In a machine tool, a cutter support and a work support; means for translating one of said supports for cutting operations; the other support being adjustable to effect adjustment between the cutter and the work; means, including a hydraulic cylinder and a piston one of which is connected to the adjustable support and the other mounted on the framework of the machine, for adjusting the depth of cut in the work by the cutter; and means for admitting pressure fluid to the cylinder to effect said adjustment in one direction and releasing pressure from the cylinder to effect adjustment in the other direction.

20. In a machine tool, a cutter and a work support; means to translate one of said parts for cutting operations; an indexable turret, mounted on the work support, for presenting new pieces of work to the cutter; a key element, and a keyway element therefor, one of said elements being fast with relation to the work holder and the other fast with relation to the turret, to lock the turret against movement during cutting operations; and means for raising the turret from the work holder after the cutting operation is completed to free the key and keyway from each other during the indexing movement, and again lower the turret after the indexing operation is completed, to connect the key and keyway, thus holding the turret against movement during the subsequent cutting operation.

21. In a machine tool, a cutter and a work support, a hydraulic pressure system, including a hydraulic motor having a cylinder and a piston, one of which is connected to the work support for translation thereof to effect cutting operations, a second hydraulic system, the fluid of which is independent of that of the first-named hydraulic system and is of normally atmospheric pressure, said second hydraulic system including a cylinder and a piston, one of which is connected to the work support to govern and stabilize its movements, said cylinder and piston of the second hydraulic system being separate and independent from those of the first-mentioned hydraulic system, and means for adjusting the flow of fluid in the second hydraulic system to control the movements of the second-mentioned piston, and consequently those of the work support.

22. In a machine tool, a cutter and a work holder, a hydraulic pressure system, including an actuator, for translating one of said parts to effect cutting operations, a second hydraulic system including a cylinder and a piston, one of which is connected to the part that is translated by the first hydraulic system, the cylinder and piston of said second hydraulic system being independent from the actuator of the first system and the fluid in said second hydraulic system also being independent from that in the first-named hydraulic system, and a controlling element for controlling the flow of fluid in said second hydraulic system, thereby governing and stabilizing the movements of the translated part.

HENRY O. FLETCHER.